US007929009B2

(12) United States Patent
Yokoyama et al.

(10) Patent No.: US 7,929,009 B2
(45) Date of Patent: Apr. 19, 2011

(54) ELECTROPHOTOGRAPHIC PHOTOSENSITIVE DRUM, ELECTROPHOTOGRAPHIC IMAGE FORMING APPARATUS, AND METHOD OF MANUFACTURING ELECTROPHOTOGRAPHIC PHOTOSENSITIVE DRUM

(75) Inventors: Katsunori Yokoyama, Susono (JP); Ryuji Yamamoto, Ashigarakami-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 755 days.

(21) Appl. No.: 11/947,944

(22) Filed: Nov. 30, 2007

(65) Prior Publication Data

US 2008/0131165 A1 Jun. 5, 2008

(30) Foreign Application Priority Data

Dec. 5, 2006 (JP) ................................ 2006-328095
Nov. 12, 2007 (JP) ................................ 2007-293102

(51) Int. Cl.
*B41J 2/435* (2006.01)
*B41J 2/385* (2006.01)
*G01D 15/06* (2006.01)

(52) U.S. Cl. ......... 347/262; 347/264; 347/139; 347/164

(58) Field of Classification Search .................. 347/139, 347/164, 262, 264; 399/191
See application file for complete search history.

(56) References Cited

U.S. PATENT DOCUMENTS 6,480,212 B1 * 11/2002 Shimoda et al. .............. 347/129
6,573,920 B2 * 6/2003 Shimoda et al. .............. 347/129

FOREIGN PATENT DOCUMENTS

JP 5-221018 A 8/1993
JP 6-095456 A 4/1994
JP 2001-018441 A 1/2001

* cited by examiner

*Primary Examiner* — Stephen D Meier
*Assistant Examiner* — Sarah Al-Hashimi
(74) *Attorney, Agent, or Firm* — Fitzpatrick, Cella, Harper & Scinto

(57) ABSTRACT

An electrophotographic photosensitive drum with a simple structure for realizing a seamless digital photosensitive drum having an exposure source and a photosensitive member which are integrated with each other. The electrophotographic photosensitive drum includes a self-luminous device portion, a functional separation portion, and a photosensitive portion. The self-luminous device portion includes a first electrode wire layer including multiple first electrode wires provided in a circumferential direction of a cylindrical substrate and arrayed in a longitudinal direction of the cylindrical substrate so as to be separated from each other by an insulating member, and each of the multiple first electrode wires is annularly formed.

6 Claims, 21 Drawing Sheets

AFTER ONE SECOND (DELAY IN DRUM ROTATION)

AFTER ONE SECOND

AFTER ONE SECOND (DELAY IN DRUM ROTATION)

AFTER ONE SECOND

ELECTROPHOTOGRAPHIC PHOTOSENSITIVE DRUM, ELECTROPHOTOGRAPHIC IMAGE FORMING APPARATUS, AND METHOD OF MANUFACTURING ELECTROPHOTOGRAPHIC PHOTOSENSITIVE DRUM

BACKGROUND OF THE INVENTION

1. Field of the Invention

The present invention relates to a photosensitive member serving as a latent image forming device, and more particularly, to an electrophotographic photosensitive drum serving as a photosensitive device integrated with an exposure source. Further, the present invention relates to an electrophotographic image forming apparatus using the electrophotographic photosensitive drum. Still further, the present invention relates to a method of manufacturing the electrophotographic photosensitive drum.

2. Description of the Related Art

In an electrophotographic process, a photosensitive member is uniformly charged and then exposed to light with a desired pattern based on image information so as to form a charge density distribution (latent image) on a surface of the photosensitive member. After that, the charge density distribution thus formed is developed with toner, to thereby obtain a visible image.

As a product to which the electrophotographic process is applied, a laser printer and an LED printer are widely used.

In the laser printer, a semiconductor laser is used as an exposure source, and a laser beam of the semiconductor laser is reflected by a rotating polygon mirror to thereby perform scanning on the photosensitive member.

In this case, in the following description, a main scanning direction of the rotary drum-shaped photosensitive member indicates a longitudinal direction of the drum (drum generatrix direction). Further, a sub-scanning direction of the rotary drum-shaped photosensitive member indicates a circumferential direction of the drum.

In the LED printer, there is employed a method in which the required number of light emitting diode (LED) pixels are arranged in a laser scanning direction (main scanning direction) of the laser printer, thereby forming an image on the surface of the photosensitive member by use of an imaging device.

The LED printer is characterized in that image positioning accuracy is enhanced because main scanning involved in the laser printer is not performed in the LED printer.

However, in both the laser printer and the LED printer, accuracy of sub-scanning is determined depending on a relative position and a relative speed between the photosensitive drum and the exposure source. Accordingly, unevenness in pitch is generated in a sub-scanning direction due to, for example, vibration of the exposure source, decentering of the photosensitive drum, and fluctuation in rotational speed.

In order to enhance the accuracy of the sub-scanning, it is possible to reduce a relative speed between the exposure source and the photosensitive member to zero. Specifically, it is possible that the exposure source and the photosensitive member are to be integrated with each other. As examples of the method of obtaining the integrated structure, the following methods have been employed.

(1) An example of a flat-plate photosensitive device is one in which a photoconductive layer is stacked on a light emitting device through an intermediate buffer layer.

Japanese Patent Application Laid-Open No. H05-221018 discloses introduction of the intermediate buffer layer, as a method of stacking an a-Si photoconductive layer (amorphous silicon photoconductive layer) with high hardness on a thin-film electroluminescence (EL) layer.

(2) An example of a flat-plate photosensitive device is one in which an a-Si photoconductive layer is stacked on a light emitting array layer through an insulating layer.

Japanese Patent Application Laid-Open No. H06-095456 discloses a top emission structure of an inorganic LED in which a pixel thin-film-transistor (TFT) matrix is formed on a glass substrate.

(3) An example of a photosensitive drum in which a photoconductive layer is stacked on an electroluminescence (EL) device including a pixel TFT.

Japanese Patent Application Laid-Open No. 2001-018441 discloses a device transfer process as a method of forming the EL device including a TFT layer on a cylindrical substrate.

In this case, the rotary drum-shaped photosensitive member, in which the exposure source and the photosensitive member are integrated with each other, that is, the drum integrated with the exposure source, in which pixels are formed on the photosensitive member so as to eliminate the factor of deviation in positional accuracy of an image not only in the main scanning direction but also in the sub-scanning direction, is hereinafter referred to as a digital photosensitive drum.

It is appropriate for a direction of technical development to employ the method of using the digital photosensitive drum in view of the technical transition from point scanning with a laser beam to an LED array in which the main scanning direction is fixed, and further, from the LED array to a pixel matrix system in which the sub-scanning direction is also fixed.

However, in view of a use mode as a printer, the conventional digital photosensitive drum system is inconvenient in terms of continuous printing. Note that the continuous printing of this case relates to a small-diameter drum (drum perimeter<print length area) or the like used in a case of continuous printing on a consecutive sheet (for example, roll paper) and printing on a cut sheet.

This is because, in the structures disclosed in Japanese Patent Application Laid-Open Nos. H05-221018 and H06-095456, a device having the flat-plate exposure source and the photosensitive member which are integrated with each other is used, thereby making it difficult to deal with the continuous printing.

Further, in the structure of the digital photosensitive drum disclosed in Japanese Patent Application Laid-Open No. 2001-018441, a self-luminous device is wound around the drum substrate, so a seam is formed in the circumferential direction of the drum. Specifically, as illustrated in FIG. 3 of Japanese Patent Application Laid-Open No. 2001-018441, when a planar pixel array is formed and then the pixel array is bonded on a cylindrical substrate, a seam is inevitably formed. For this reason, in the seam portion, the pixel array is formed in a discontinuous manner, which causes an image defect. As a result, printing cannot be performed on a continuous area larger than the drum perimeter.

SUMMARY OF THE INVENTION

Therefore, the present invention realizes a seamless digital photosensitive drum which can be mounted in an electrophotographic image forming apparatus as an electrophotographic photosensitive drum, with a simple structure. Further, the present invention provides an electrophotographic image forming apparatus using the seamless digital photosensitive drum. Further, the present invention provides a method of manufacturing the seamless digital photosensitive drum.

According to an aspect of the present invention, there is provided an electrophotographic photosensitive drum including; a cylindrical substrate; a self-luminous device portion which includes; a first electrode wire layer including multiple first electrode wires each annularly extending in a circumferential direction of the cylindrical substrate; a second electrode wire layer including multiple second electrode wires each extending in a longitudinal direction of the cylindrical substrate; and an electroluminescence layer, the multiple first electrode wires being arrayed in the longitudinal direction of the cylindrical substrate so as to be separated from each other by an insulating member, the multiple second electrode wires being arrayed in the circumferential direction of the cylindrical substrate so as to be separated from each other by an insulating member, the first electrode wire layer, the electroluminescence layer, and the second electrode wire layer being stacked in the stated order toward a surface of the electrophotographic photosensitive drum from the cylindrical substrate; a functional separation portion which includes: a transparent insulating layer formed on the self-luminous device portion; and a transparent conductive layer formed on the transparent insulating layer; and a photosensitive portion formed on the transparent conductive layer, in which each of the multiple first electrode wires is annularly formed with no seam.

According to another aspect of the present invention, there is provided a method of manufacturing an electrophotographic photosensitive drum, including: forming a self-luminous device portion on a cylindrical substrate, the self-luminous device portion including: a first electrode wire layer including multiple first electrode wires each annularly extending in a circumferential direction of the cylindrical substrate; a second electrode wire layer including multiple second electrode wires each extending in a longitudinal direction of the cylindrical substrate; and an electroluminescence layer, the multiple first electrode wires being arrayed in the longitudinal direction of the cylindrical substrate so as to be separated from each other by an insulating member, the multiple second electrode wires being arrayed in the circumferential direction of the cylindrical substrate so as to be separated from each other by an insulating member, the first electrode wire layer, the electroluminescence layer, and the second electrode wire layer being stacked in the stated order toward a surface of the electrophotographic photosensitive drum from the cylindrical substrate; forming a functional separation portion which includes: a transparent insulating layer; and a transparent conductive layer, the transparent insulating layer and the transparent conductive layer being formed in the stated order after the formation of the self-luminous device portion; and forming a photosensitive portion after the formation of the transparent conductive layer, in which each of the multiple first electrode wires is annularly formed with no seam through a process on the cylindrical substrate from an outer periphery thereof.

With the structure of the electrophotographic photosensitive drum and the method of manufacturing the same according to the present invention, a seamless digital photosensitive drum can be realized. Further, with the structure of the electrophotographic image forming apparatus to which the seamless digital photosensitive drum is mounted, it is possible to use a digital photosensitive drum having a small diameter and having a perimeter smaller than a print length of a print medium to be used according to specifications. Accordingly, the image forming apparatus can be downsized.

Further features of the present invention will become apparent from the following description of an exemplary embodiment with reference to the attached drawings.

DESCRIPTION OF THE EMBODIMENT

Embodiment 1

(1) Image Forming Portion

Figure 1:
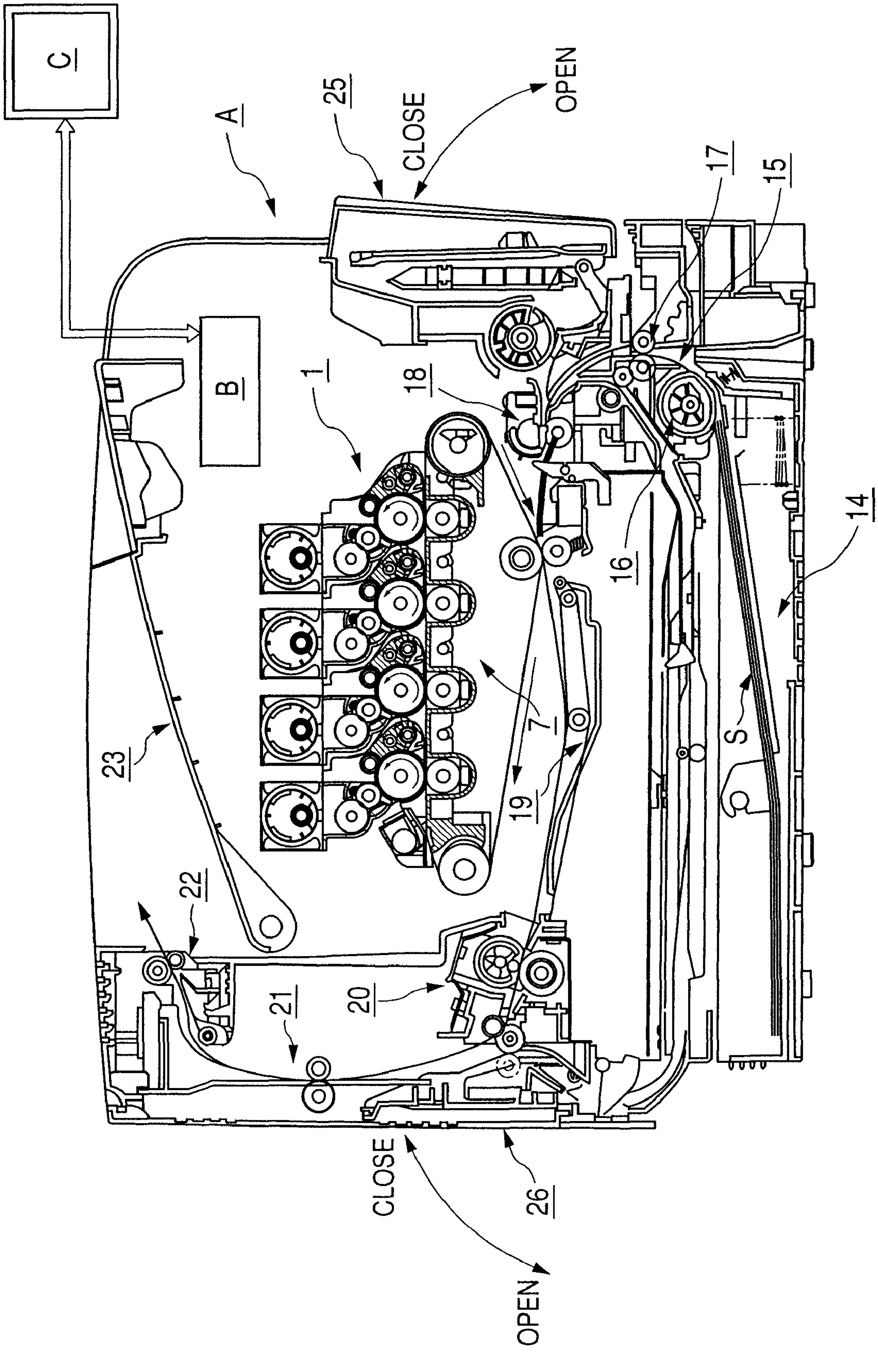
FIG. 1 a schematic cross-sectional diagram illustrating a schematic structure of an electrophotographic image forming apparatus according to an embodiment of the present invention.
Figure 2:
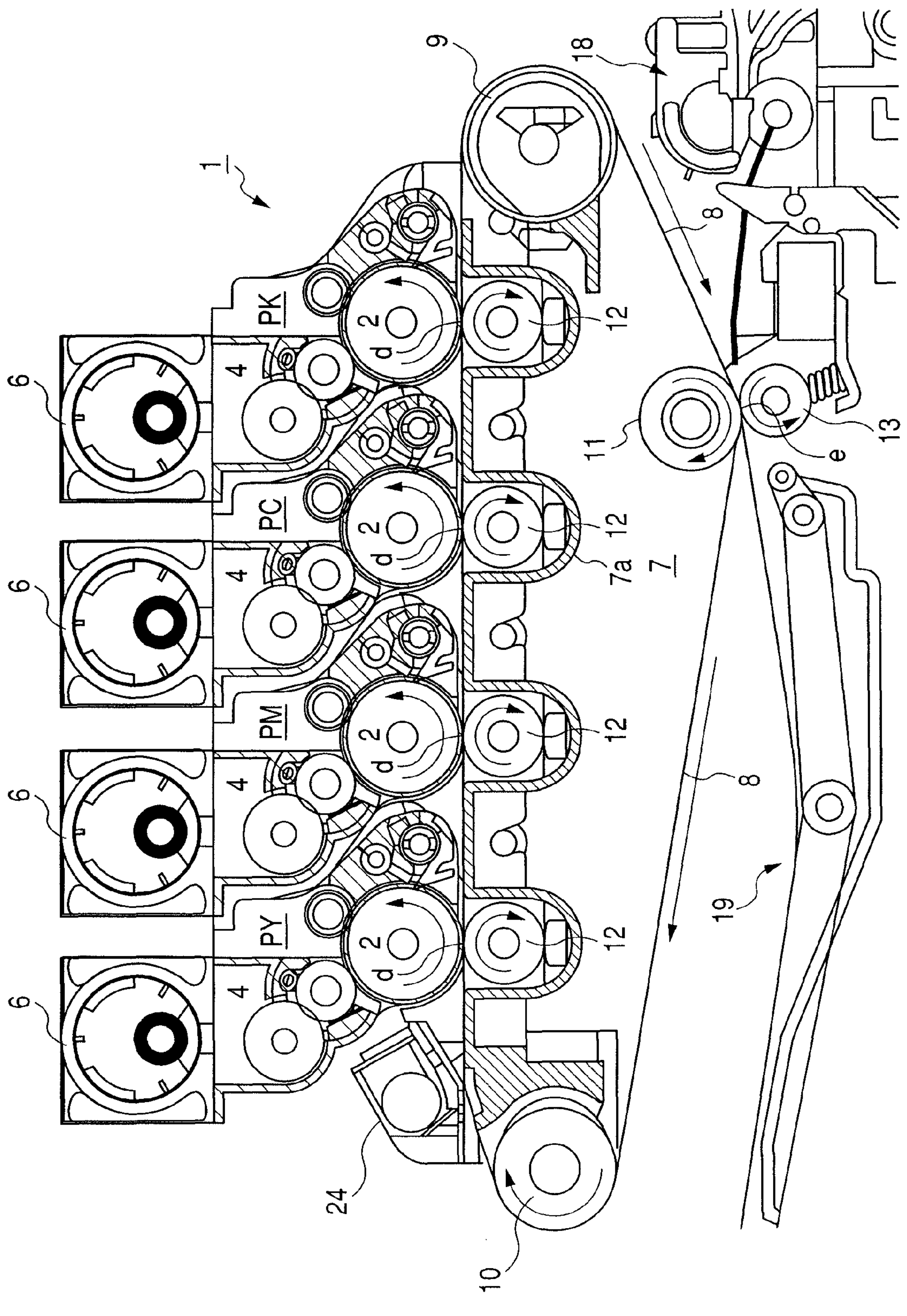
FIG. 2 is an enlarged diagram illustrating portions of an image forming unit and an intermediate transfer belt unit which are provided in the electrophotographic image forming apparatus.
Figure 3:
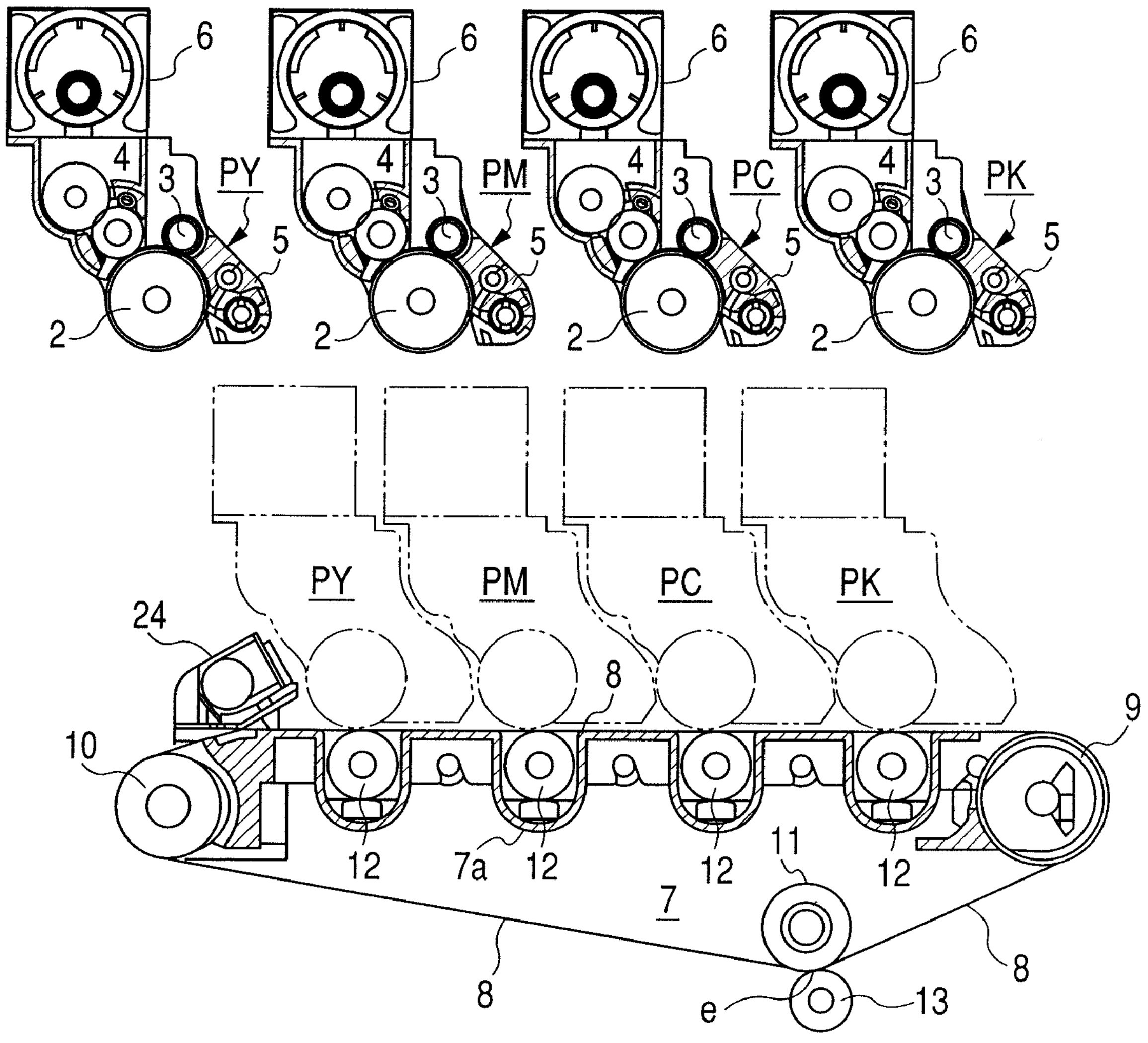
FIG. 3 is an exploded schematic diagram illustrating first to fourth process cartridges which are mounted to the image forming unit, and the intermediate transfer belt unit.
Figure 4:
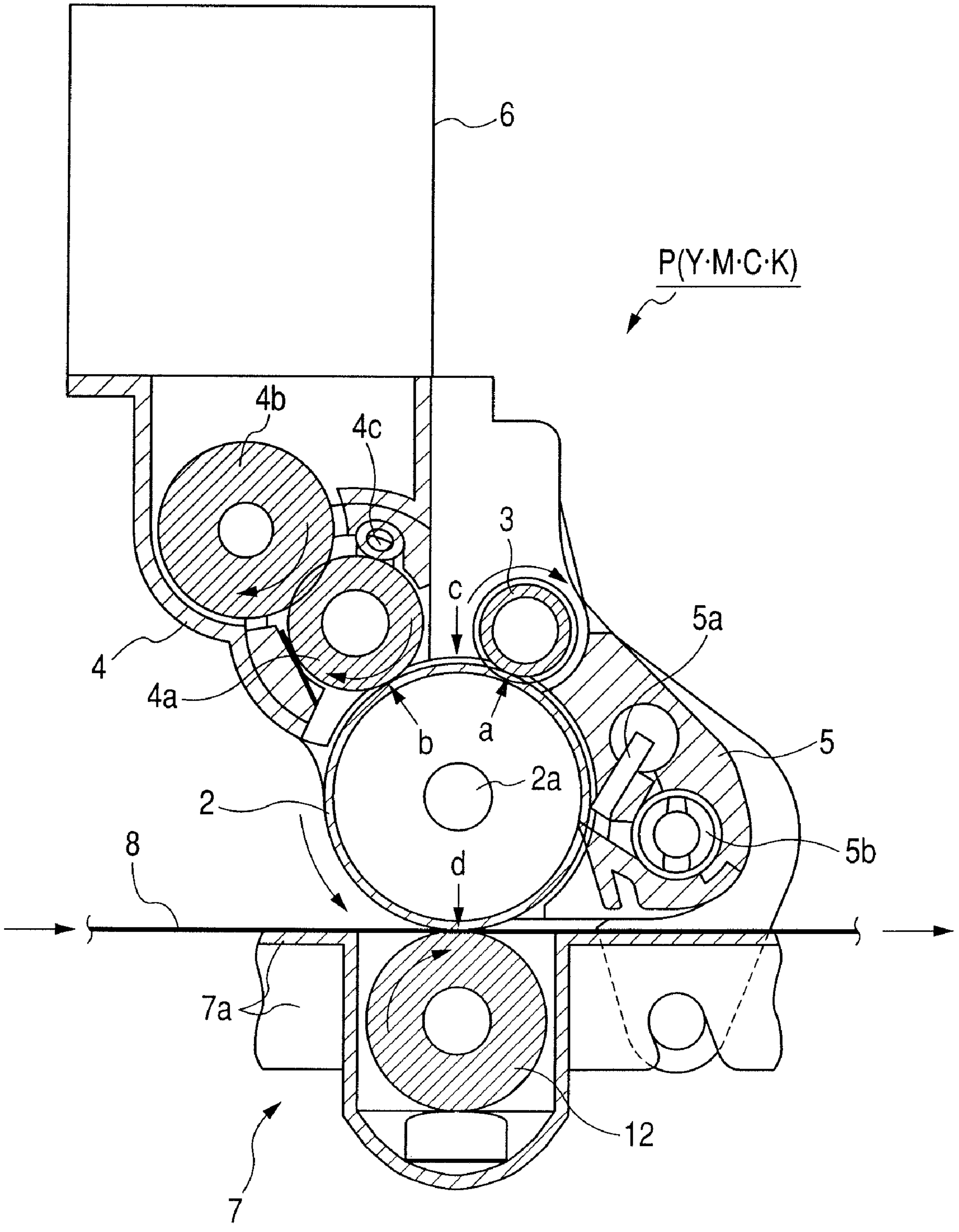
FIG. 4 is an enlarged schematic cross-sectional diagram illustrating a schematic structure of a single cartridge.

FIG. 1 is a schematic cross-sectional diagram illustrating a schematic structure of an electrophotographic image forming apparatus A according to an embodiment of the present invention. FIG. 2 is an enlarged diagram illustrating portions of an image forming unit 1 and an intermediate transfer belt unit (ITB unit; hereinafter, referred to simply as "belt unit") 7 which are provided in the electrophotographic image forming apparatus A. FIG. 3 is an exploded schematic diagram illustrating first to fourth process cartridges (hereinafter, referred to simply as "cartridge") PY, PM, PC, and PK which are mounted to the image forming unit 1, and the intermediate transfer belt unit 7. FIG. 4 is an enlarged schematic cross-sectional diagram illustrating a schematic structure of a cartridge P (Y, M, C, K).

The image forming apparatus A according to this embodiment of the present invention is a full-color digital electrophotographic printer of a four-drum-tandem type using an endless belt as an intermediate transfer member.

The printer A is capable of forming a full-color image or a mono-color image corresponding to electrical image data (image information signal), which is input from an external device (host device) C connected to a main body control circuit portion B, on a surface of a sheet-like recording material S, and outputting (printing out) the sheet material S.

The external device C is a personal computer, an image reader, a facsimile machine, or the like.

The main body control circuit portion (controller) B exchanges various electrical information signals with the external device C. In addition, the main body control circuit portion B performs processing for the electrical information signals input from image forming process devices, sensors, and the like and for command signals sent to the image forming process devices and the like, and performs a predetermined image forming sequence control. Further, the main body control circuit portion B executes an operational control of the entire printer according to a control program and a reference table which are stored in a ROM or a RAM.

The image forming unit 1 is disposed above the belt unit 7 and has a structure of a horizontal tandem type in which the first to fourth cartridges PY, PM, PC, and PK are arranged in series from the left side to the right side of the drawing. Each cartridge P (Y, M, C, K) can be individually detachably mountable and replaceable with respect to a unit frame (not shown) of the image forming unit 1.

The first to fourth cartridges PY, PM, PC, and PK each form a color separation component image of a full-color image, that is, a toner image of each of yellow, magenta, cyan, and black. In the embodiment of the present invention, the cartridges for forming the toner images of yellow, magenta, cyan, and black are arranged in order of image formation to be executed. However, the order of colors in which the image formation is to be performed is not limited thereto, and the cartridges may be arranged in order of arbitrary colors.

With reference to FIG. 4, each cartridge P (Y, M, C, K) has the same structure in an electrophotographic process mechanism, and includes a drum-shaped electrophotographic photosensitive member (hereinafter, referred to simply as "drum") 2 which has a major role in an image forming process.

Each drum 2 is a digital photosensitive drum in which a photoconductive layer is stacked on a matrix layer of a light emitting device, and an exposure source and an latent image forming device are integrated with each other. At the time of executing the image forming process, each drum 2 is rotationally driven counterclockwise at a predetermined angular velocity around a drum shaft (central spindle) 2_a_ thereof. The digital photosensitive drum 2 is described later.

Further, each cartridge P (Y, M, C, K) includes a charging roller (charging device) 3, a developing unit (developing device) 4, and a drum cleaning device (cleaning device) 5, which form an electrophotographic process unit operating on the drum 2. Note that a yellow toner as a developer is contained in the developing unit 4 of the first cartridge PY. A magenta toner as a developer is contained in the developing unit 4 of the second cartridge PM. A cyan toner as a developer is contained in the developing unit 4 of the third cartridge PC. A black toner as a developer is contained in the developing unit 4 of the fourth cartridge PK.

Each charging roller 3 has a roller portion made of a conductive rubber provided on a metal shaft portion thereof, and is disposed substantially in parallel with the drum 2 so as to be brought into pressure contact with the drum 2 with a predetermined pressing force. Thus, each charging roller 3 is driven by the rotation of the drum 2 to be rotated. A DC voltage of, for example, −700 V as a dark potential Vd with respect to a substrate potential of the drum 2, is applied as a charging bias, from a power supply portion (not shown) to the metal shaft portion of the charging roller 3. Then, at a charging position "a" which is a contact portion between the drum 2 and the charging roller 3, on the surface of the drum 2 having a dielectric coating film, a uniform surface charge distribution with a potential of about −450 V can be formed.

With respect to the drum surface with the uniform surface charge distribution, a light emitting device of the drum corresponding to image data is lit, thereby exposing a spot pattern from a back surface of the photosensitive member at a position between the charging position "a" and a developing position "b", that is, an exposure point "c" which is in the vicinity of an uppermost position in the vertical direction of the drum 2 in FIG. 4. The developing position "b" corresponds to a portion at which the drum 2 is exposed to the action of development by the developing unit 4, and corresponds to a portion at which a developing roller 4_a_ is in contact with the drum 2 in the embodiment of the present invention.

In the photoconductive layer of the drum 2 exposed to light through the lighting of the light emitting device, carriers are generated in a carrier generation layer (CGL) and holes are moved in a carrier transport layer (CTL) under the action of an electric field due to charges on the uniformly charged surface, thereby neutralizing the surface charges. As a result, there is formed a surface charge density distribution in which a potential (light potential) V1 at an exposed portion of the photosensitive member of the drum 2 is about −50 V and a potential (dark potential) Vd at a non-exposed portion thereof is about −400 V. In other words, an electrostatic latent image is formed on the surface of the drum 2.

In this manner, in the first cartridge PY, on the surface of the rotating drum 2, an electrostatic latent image corresponding to a yellow color component image of the full-color image is formed, and the electrostatic latent image thus formed is developed as a yellow toner image by the developing unit 4.

In the second cartridge PM, on the surface of the rotating drum 2, an electrostatic latent image corresponding to a magenta color component image of the full-color image is formed, and the electrostatic latent image thus formed is developed as a magenta toner image by the developing unit 4.

In the third cartridge PC, on the surface of the rotating drum 2, an electrostatic latent image corresponding to a cyan color component image of the full-color image is formed, and the electrostatic latent image thus formed is developed as a cyan toner image by the developing unit 4.

In the fourth cartridge PK, on the surface of the rotating drum 2, an electrostatic latent image corresponding to a black color component image of the full-color image is formed, and the electrostatic latent image thus formed is developed as a black toner image by the developing unit 4.

For each developing unit 4, a so-called non-magnetic, one-component contact development process is employed in the embodiment of the present invention. Each developing unit 4 includes the developing roller 4*a* having the roller portion made of conductive rubber. The developing roller 4*a* is disposed substantially in parallel with the drum 2 so as to be brought into pressure contact with the drum 2 with the predetermined pressing force. The developing roller 4*a* is driven independently of the drum 2 by a drive mechanism (not shown). Tangential speed directions of the developing roller 4*a* and the drum 2 at the developing position “b”, which is the contact portion between the developing roller 4*a* and the drum 2, are the same, but a tangential speed ratio between the developing roller 4*a* and the drum 2 is about 2:1.

To the developing unit 4 of each cartridge P (Y, M, C, K), a toner is supplied from a toner tank (toner cartridge) 6 set above each cartridge P at a predetermined control timing. The toner supplied to the developing unit 4 is subjected to contact electrification due to interaction among a supply roller 4*b* and a trimmer 4*c*, which are disposed to be brought into contact with the developing roller 4*a*, and the developing roller 4*a*. Then, the toner is coated on a surface layer of the developing roller 4*a*, and a mass of coated toner per unit area is regulated so as to obtain a desired value. After that, the toner is carried to the developing position “b” through the rotation of the developing roller 4*a*. To the developing roller 4*a*, a predetermined developing bias is applied from a power supply portion (not shown). For example, between the developing roller 4*a* and the substrate of the drum 2, a developing bias of, for example, −200 V is applied. As a result, under the above-mentioned latent image conditions, when a development contrast Vc is set to 150 V and a back contrast Vbc is set to 200 V, the latent image is developed with toner, thereby enabling formation of the toner image on the drum 2.

The belt unit 7 includes an intermediate transfer belt (hereinafter, referred to simply as a “belt”) 8 made of an endless dielectric member with flexibility. The belt 8 is hung around three rollers, that is, a drive roller 9, a tension roller 10, and a secondary transfer opposing roller 11, which are substantially in parallel with each other, as suspension members, under tension. The three rollers are disposed so as to be rotatably borne by a belt unit frame 7*a*. Inside the belt 8, four primary transfer rollers 12 corresponding to each cartridge P (Y, M, C, K) are provided. The primary transfer rollers 12 each have a roller portion which is made of conductive rubber and is provided to a metal shaft portion thereof, and are arrayed substantially in parallel with the corresponding drums 2. Further, the primary transfer rollers 12 are each brought into pressure contact with a lower surface portion of each drum 2 with a predetermined pressing force through the belt 8. A contact nip portion between the drum 2 and the belt 8 corresponds to a primary transfer position “d”. Also the primary transfer rollers 12 are each disposed so as to be rotatably borne by the belt unit frame 7*a*.

At the time of executing the image forming process, the belt 8 is rotationally driven clockwise as indicated by the arrow at a predetermined speed. A speed criterion of the drum 2 of each cartridge P (Y, M, C, K) at the time of executing the image forming process is synchronous with the tangential speed of the belt 8. In the embodiment of the present invention, in order to synchronize the speed criterion with the image formation of each cartridge P (Y, M, C, K), a drive transmission method using a timing belt is employed. Specifically, a transfer drive pulley provided above a shaft of the primary transfer roller of each cartridge P (Y, M, C, K) is driven by the timing belt to which a driving force is transmitted from a pulley provided above a belt drive shaft. In addition, a transfer roller gear and a drum gear are engaged with each other, thereby transmitting the driving force to the drum shaft 2*a*, that is, the drum 2.

On each drum 2 of the first to fourth cartridges PY, PM, PC, and PK, color toner images of yellow, magenta, cyan, and black, which are color separation component images of the full-color image, are respectively formed at the predetermined control timing. At the primary transfer position “d”, the yellow toner image formed on the drum 2 of the first cartridge PY is primarily transferred onto the belt 8 which is rotationally driven. At the primary transfer position “d”, the magenta toner image formed on the drum 2 of the second cartridge PM is primarily transferred onto the yellow toner image formed on the belt 8 in a superimposed manner. At the primary transfer position “d”, the cyan toner image formed on the drum 2 of the third cartridge PC is primarily transferred onto the yellow toner image and the magenta toner image which are formed on the belt 8 in a superimposed manner. At the primary transfer position “d”, the black toner image formed on the drum 2 of the fourth cartridge PK is primarily transferred onto the yellow toner image, the magenta toner image, and the cyan toner image, which are formed on the belt 8 in a superimposed manner. In other words, the four color toner images of yellow, magenta, cyan, and black are sequentially superimposedly (multi-layeredly) transferred onto the predetermined position of the belt 8, thereby synthesizing and forming a full-color unfixed toner image (mirror image).

At the primary transfer position “d” of each cartridge P (Y, M, C, K), the toner images are primarily transferred onto the belt 8 from each drum 2 by the action of the electric field formed by a predetermined transfer bias applied to each primary transfer roller 12 from each power supply portion (not shown).

In each cartridge P (Y, M, C, K), untransferred toner remaining on each drum 2 after the transfer of the toner images onto the belt 8 is scraped off as waste toner from the drum surface by using a cleaning blade 5*a*, which is made of polyurethane rubber, of the drum cleaning device 5. The waste toner thus scraped off is recovered by a waste toner screw 5*b* into a waste toner container (not shown) provided to the image forming unit 1.

The full-color unfixed toner image thus synthesized and formed on the belt 8 is carried through the continuous rotation of the belt 8, and reaches a secondary transfer position "e" which is a contact portion between the belt 8 and the secondary transfer roller 13. The secondary transfer roller 13 has a roller portion which is made of conductive rubber and is provided to a metal shaft thereof, and is disposed substantially in parallel with the secondary transfer opposing roller 11 so as to sandwich the belt 8, thereby being brought into pressure contact with the secondary transfer opposing roller 11 with a predetermined pressing force. Then, the secondary transfer roller 13 is rotated in a forward direction with respect to a belt movement direction at the same speed as that of the belt 8.

On the other hand, in response to a demand for an image forming (printing) operation, by a separation feed roller 16 provided in a sheet feed/transport unit 15, only a top recording material of the sheet-like recording materials (recording papers) S, which are stacked in a sheet feed cassette 14 disposed at a lower portion of the printer main body, is separated. The recording material S passes through a transport roller pair 17 to be fed to a registration unit 18. The registration unit 18 allows the recording material S to be fed to the secondary transfer position "e" at a timing when a position of a leading end of the toner image formed on the belt 8 is synchronized with a position of a leading edge of the recording material S. The recording material S entering the secondary transfer position "e" is sandwiched and transported at the secondary transfer position "e". During the transportation process, a predetermined transfer bias is applied to the secondary transfer roller 13 from a power supply portion (not shown), thereby sequentially performing collective transfer of the four-color toner images superimposed on the belt 8.

The recording material S passing through the secondary transfer position "e" is separated from the surface of the belt 8, and is introduced to a fixing unit 20 of a heat and pressure type by a transport unit 19. The unfixed full-color toner image formed on the recording material S is applied with heat and pressure by the fixing unit 20, thereby being fused, mixed, and fixed onto the recording material. Then, the recording material S passes through a longitudinal transporting unit 21 and a delivery unit 22 and is delivered onto a face-down delivery tray 23 as a full-color image formed material.

Further, the untransferred toner remaining on the belt 8 after the transfer of the toner image onto the recording material S is removed and recovered by a belt cleaning device 24.

The above-provided description relates to a full-color image forming mode. In a case of a mono-color image forming mode for forming a monochromatic image or the like, a cartridge for a designated color operates for image formation. The other cartridges do not operate for image formation while each drum 2 thereof is rotationally driven.

In FIG. 1, a multiple feed unit (manual feed unit) 25 is provided on a side of a right-side surface of the printer A. The multiple feed unit 25 is disposed so as to be capable of being opened and closed with respect to the printer main body. When not in use, the multiple feed unit 25 is shifted to a state of being closed with respect to the printer main body, and when in use, the multiple feed unit 25 is shifted to a state of being opened with respect to the printer main body. Further, in FIG. 1, a face-up delivery tray 26 is provided on a side of a left-side surface of the printer A. The face-up delivery tray 26 is disposed so as to be capable of being opened and closed with respect to the printer main body. When not in use, the face-up delivery tray 26 is shifted to a state of being closed with respect to the printer main body, and when in use, the face-up delivery tray 26 is shifted to a state of being opened with respect to the printer main body.

The printer A according to the embodiment of the present invention has a drawer structure capable of drawing the secondary transfer roller 13, the sheet feed/transport unit 15, the registration unit 18, and the multiple feed unit 25, as one unit, from the right side (multiple feed unit side) of the printer main body shown in FIG. 1. In addition, the image forming unit 1 is mounted above the drawer. At the time of replacing toner, the drawer is drawn out and a toner tank 6, which is provided above the image forming unit 1 and is drawn out, is replaced, thereby facilitating the replacement of the toner. Similarly, each cartridge P (Y, M, C, K) can also be easily replaced by drawing out the drawer and replacing the cartridge which is provided above the image forming unit 1 and is drawn out. In the printer according to the embodiment of the present invention, the toner tank (toner cartridge) has a toner capacity of 3,000 sheets of A4 size sheets in the coverage rate of 5%, and the durable number of sheets is 50,000 in each cartridge P (Y, M, C, K).

(2) Digital Photosensitive Drum 2

Figure 5A:
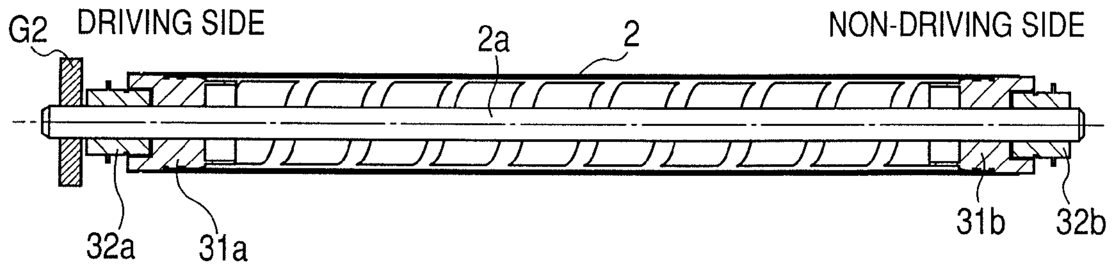
FIG. 5A is a longitudinal sectional diagram of a digital photosensitive drum.
Figure 5B:
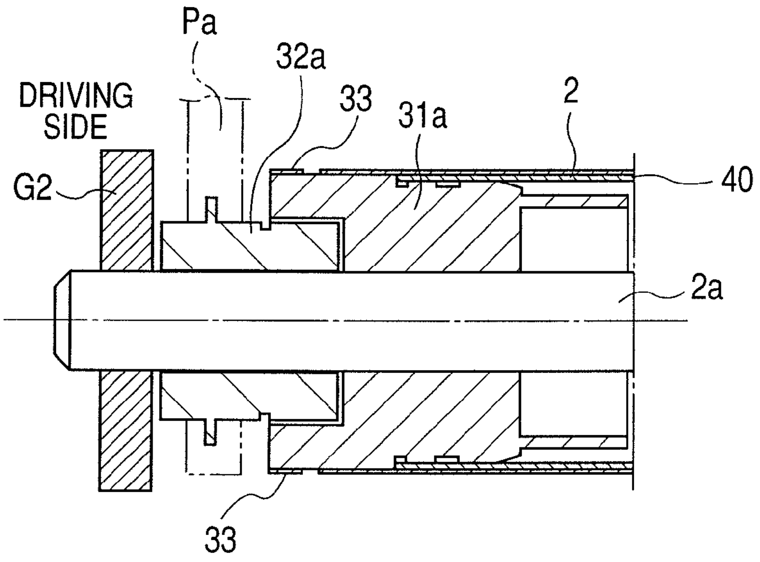
FIG. 5B is an enlarged diagram of one end side (driving side) of the digital photosensitive drum.
Figure 5C:
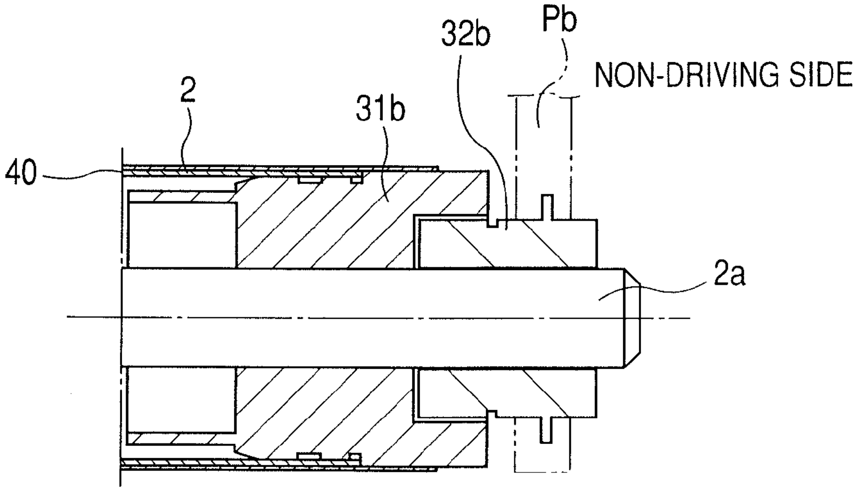
FIG. 5C is an enlarged diagram of the other end side (non-driving side) of the digital photosensitive drum.
Figure 6:
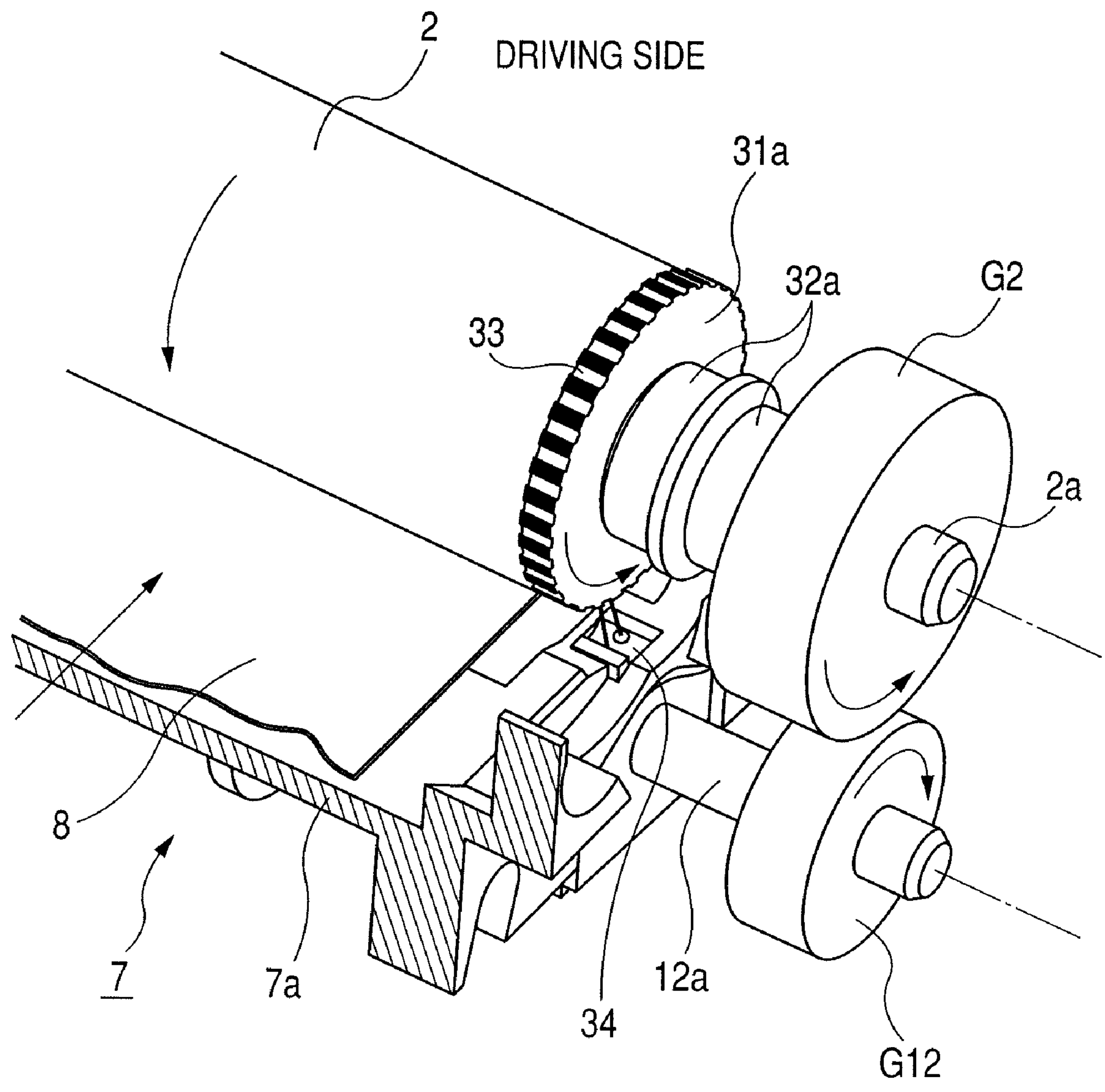
FIG. 6 is a perspective view illustrating a drive portion and a phase detecting portion of the digital photosensitive drum.

FIG. 5A is a longitudinal sectional diagram of the digital photosensitive drum 2. FIG. 5B is an enlarged diagram illustrating one end side (driving side) of the digital photosensitive drum 2. FIG. 5C is an enlarged diagram illustrating the other end side (non-driving side) of the digital photosensitive drum 2. FIG. 6 is a perspective view illustrating a drive portion and a phase detecting portion of the digital photosensitive drum 2.

The digital photosensitive drum 2 is a rotary drum-shaped photosensitive device in which a self-luminous device portion, which is a light emitting element matrix layer, a functional separation portion, and a photosensitive portion are stacked on a cylindrical substrate, and in which the exposure source and the latent image forming device are integrated with each other. At both opening portions of the drum 2, cylindrical flanges 31*a* and 31*b* are press-fitted coaxially with the drum 2 to be fixed and mounted. Between the flanges 31*a* and 31*b*, the drum shaft 2*b* is inserted to be mounted. The flanges 31*a* and 31*b* are fixed to the drum shaft 2*a* in an integrated manner. An axis of the drum 2 and an axis of the drum shaft 2*a* are coaxially matched with each other. Both end portions of the drum shaft 2*a* are allowed to protrude to an outside from the flanges 31*a* and 31*b*, respectively, and protruding shaft portions are fitted with bearings 32*a* and 32*b*, respectively. In addition, at the protruding shaft portion on a driving side, a drum gear G2 is coaxially fitted with the drum shaft 2*a* to be fixed thereto in an integrated manner. Further, on an outer peripheral portion (outer diameter portion) of an end portion of the flange 31*a* on the driving side, an encoder wheel portion 33 for phase detection is provided. The bearings 32*a* and 32*b* are held by frames Pa and Pb, respectively, of each process cartridge P (Y, M, C, K).

In a state where each process cartridge P (Y, M, C, K) is mounted at a predetermined position of the printer main body, a drum gear G2 of each process cartridge is engaged with a transfer roller gear G12 on a side of the corresponding primary transfer roller as illustrated in FIG. 6. A driving force is transmitted from the transfer roller gear G12 to the drum gear G2, thereby rotationally driving the drum shaft 2*a*. That is, the drum 2 is rotationally driven. As described above, the torque of the belt drive roller 9 of the belt unit 7 is transmitted to each primary transfer roller 12 through a power transmission mechanism of the pulley and the timing belt, thereby rotating each primary transfer roller 12. The transfer roller gear G12 is coaxially fixed to a shaft 12*a* of the primary transfer roller 12 in an integrated manner, thereby being rotated integrally with the primary transfer roller 12. The rotation of the transfer roller gear G12 is transmitted to the drum gear G2, thereby rotationally driving the drum 2. The speed criterion of the drum 2 of each cartridge P (Y, M, C, K) at the time of executing the image forming process is synchronized with the tangential speed of the belt 8.

Figure 7:
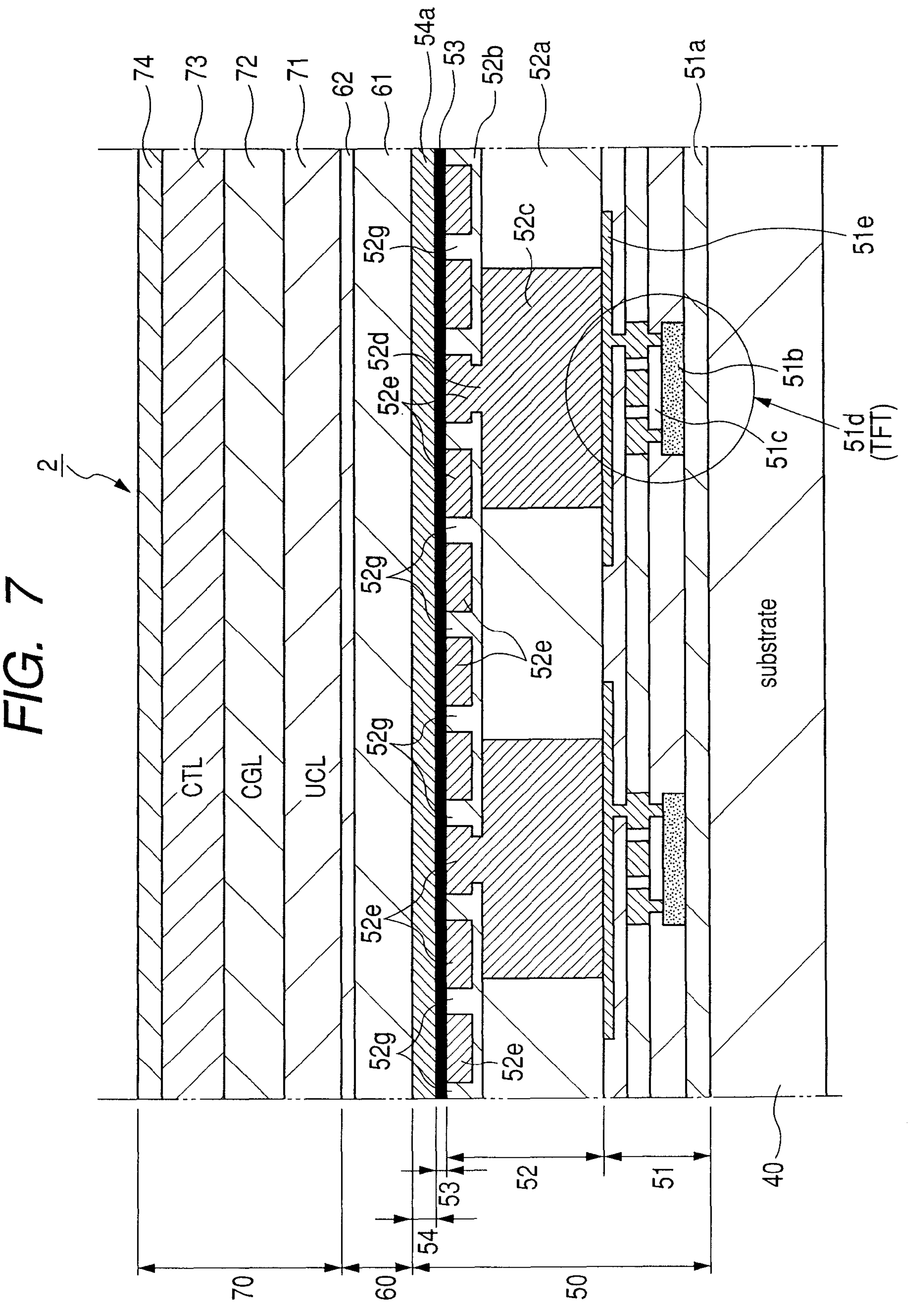
FIG. 7 is a schematic diagram of a layered structure of a digital photosensitive drum according to an embodiment of the present invention.

FIG. 7 is a schematic diagram of a layered structure of the digital photosensitive drum 2 according to an embodiment of the present invention. The digital photosensitive drum 2 is a rotary drum-shaped photosensitive device with the exposure source and the latent image forming device that are integrated with each other, which has three functional layers, that is, a self-luminous device portion 50 which is a light emitting element matrix layer, a functional separation portion 60, and a photosensitive portion 70 that are stacked on a cylindrical substrate 40. FIG. 7 is a planar cross-sectional diagram of the drum 2, which includes a drum axis of the drum 2 and one of second electrode wires formed in parallel with the drum axis.

In the following description, for convenience of description, a first electrode wire annularly formed in a circumferential direction of the cylindrical substrate, which is included in the self-luminous device portion 50, is referred to as "signal line," and a second electrode wire linearly formed in a longitudinal direction of the cylindrical substrate, which is included in the self-luminous device portion 50, is referred to as "scanning line."

(2-1) Cylindrical Substrate 40

As the cylindrical substrate 40, a cylinder (hereinafter, referred to as "drum cylinder") made of aluminum is used in the embodiment of the present invention.

(2-2) Self-luminous Device Portion 50

The self-luminous device portion 50 includes a control circuit (control portion) 51 for controlling a voltage applied to the signal line (first electrode wire) and the scanning line (second electrode wire), a signal line layer (first electrode wire layer) 52, an electroluminescence (EL) layer 53, and a scanning line layer (second electrode wire layer) 54. The control circuit 51, the signal line layer 52, the EL layer 53, and the scanning line layer 54 are stacked in the stated order from an inner side to an outside with respect to an outer peripheral surface of the drum cylinder 40.

The signal line layer 52 is a layer formed of a signal line group (sub-scanning signal line group) including multiple signal lines 52*e*. The signal lines 52*e* each extend annularly in the circumferential direction of the cylindrical substrate. The signal lines 52*e* are separated from each other by insulating members 52*g* and are arrayed at equal intervals in the longitudinal direction of the cylindrical substrate.

The scanning line layer 54 is a layer formed of a scanning line group (main scanning signal line group) including multiple scanning lines 54*a*. The scanning lines 54*a* each extend in the longitudinal direction of the cylindrical substrate. The scanning lines 52*a* are each separated by an insulating member 54*b* (see FIG. 11E), and are arrayed at equal intervals in the circumferential direction of the cylindrical substrate.

The annular signal line group of the signal line layer 52 and the linear scanning line group of the scanning line layer 54 form a longitudinal and lateral lattice-like structure, and an intersecting point between each of the signal lines 52*e* and each of the scanning lines 54*a* becomes a pixel portion.

The control circuit 51 has a function of performing an on/off control of each of the signal lines 52*e* of the signal line layer 52 and each of the scanning lines 54*a* of the scanning line layer 54. The control circuit 51 controls a gate 51*b* of a drive TFT 51*d* of a final stage, thereby turning on/off each of the signal lines 52*e* and each of the scanning lines 54*a*. In other words, the control circuit 51 controls each pixel independently. A source electrode of the drive TFT 51*d* is connected to an electrode pad 51*e*. The drive TFT 51*d* illustrated in FIG. 7 is a transistor of the control circuit for controlling each of the signal lines. Each drive TFT 51*d* illustrated in FIGS. 11A to 11E is a transistor of the control circuit for controlling each of the scanning lines.

The control circuit 51 is obtained by transferring a control circuit, which is formed on a glass substrate by a poly-Si process, onto the drum cylinder 40 by a so-called device transfer process. A polysilicon layer (insulating layer) 51*a* of the circuit formed by the poly-Si process is joined to a surface of the drum cylinder 40. Drivers (constant current circuit, lighting time control circuit, shift register, buffer, and the like) for driving the drive TFT 51*d* are formed on the same device.

The signal line layer 52 includes interlayer insulating layers (insulating films) 52*a* and 52*b*, the multiple annular signal lines 52*e*, and a through-hole electrode (large) 52*c* and a through-hole electrode (small) 52*d* which are interlayer electrodes for connecting each of the multiple annular signal lines 52*e* to the electrode pad 51*e* of the drive TFT 51*d*.

Figure 8:
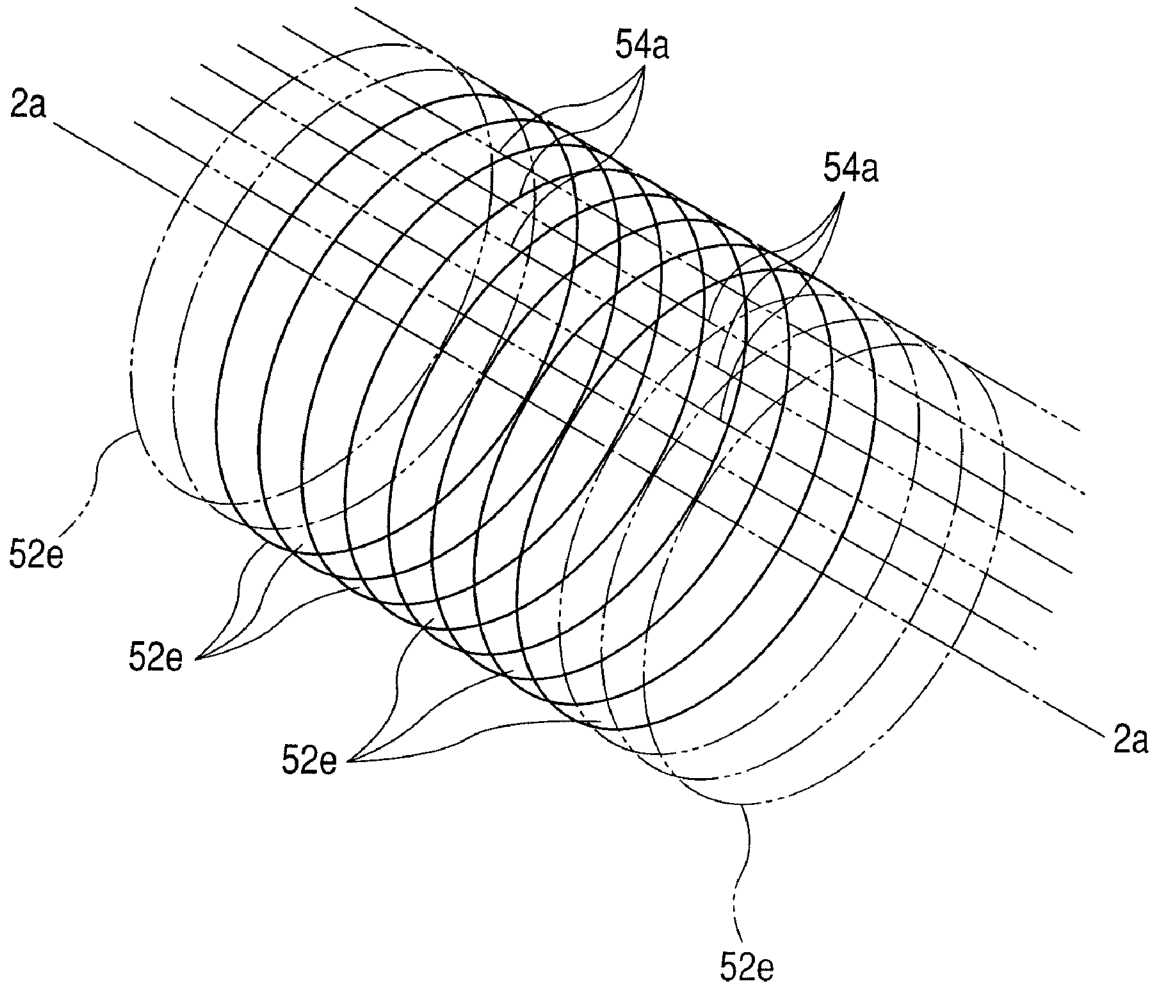
FIG. 8 is a schematic diagram of a longitudinal and lateral lattice-like structure including a signal line group of a single line layer and a signal line group of a scanning line layer.

Each of the signal lines 52*e* of the embodiment of the present invention is an Ag electrode having a width of 10 μm. As FIG. 8 illustrates the schematic diagram of the longitudinal and lateral lattice-like structure of the annular signal line group of the signal line layer 52 and the linear signal line group of the scanning line layer 54, the signal lines 52*e* are each annularly formed around the drum cylinder 40. The annular signal lines 52*e* are separated from each other by partition walls 54*b* and a large number of annular signal lines 52*e* are disposed at equal predetermined intervals in the longitudinal direction of the drum cylinder. In the embodiment of the present invention, each interval between the annular signal lines 52*e* is about 42 μm (image resolution of 600 dpi), 5,120 annular signal lines 52*e* (corresponding to A4-size portrait printing) are disposed so that the axis of the annular signal lines 52*e* matches the axis of the drum shaft 2*a*. The signal lines 52*e* are each connected to the electrode pad 51*e* of the drive TFT 51*d* via the through-hole electrodes 52*d* and 52*c*.

The EL layer 53 forms a fluorescent light emitting device of a charge injection type with an organic EL layer. In the embodiment of the present invention, a side of the signal lines 52*e* is set as a cathode of a metal electrode (Ag), and a side of the scanning lines 54*a* is set as an anode of a metal oxide (ITO). Accordingly, there is employed a four-layered structure in which an electron transport layer (ETL), an emissive layer (EML), a hole transport layer (HTL), and a hole injection layer (HIL) are formed in the stated order from the signal line 52*e* side toward the scanning line 54*a* side.

The scanning lines 54*a* of the scanning line layer 54 each have a width of 10 μm, and are linear pattern electrodes each extending in the longitudinal direction of the drum cylinder. The scanning lines 54*a* are separated from each other by each partition wall 54*b* which is an insulating member, and a large number of scanning lines 54*a* are disposed at equal predetermined intervals in the circumferential direction of the cylindrical substrate. The scanning lines 54*a* are each made of a transparent conducting oxide (ITO). In the embodiment of the present invention, each interval between the scanning lines 54*a* is about 42 μm (resolution (number of pixels) of 600 dpi), and 1,800 scanning lines 54*a* (with a drum having a diameter of 24 mm and at phase angle of 0.2°) are disposed in parallel with the drum axis or disposed with a crossing angle with respect to the drum axis. The scanning lines 54*a* are each connected to the electrode pad 51*e* of the drive TFT 51*d* via the through-hole electrodes 54*c* and 52*c* as illustrated in FIG. 11E.

(2-3) Functional Separation Portion 60

The functional separation portion 60 includes: a transparent insulating/gas barrier layer (hereinafter, referred to as "transparent insulating/barrier layer") 61 which is a transparent insulating layer for electrically insulating the self-luminous device portion 50 and the photosensitive portion 70; and a transparent conductive layer (transparent conductive film) 62 formed on the transparent insulating/barrier layer 61. The transparent insulating/barrier layer 61 has a multilayer stacked structure including an organic polymer film and a metal oxide thin film ($Al_2O_3$). The transparent conductive layer 62 is obtained by depositing ITO on a surface (cylindrical outer peripheral surface side) of the transparent insulating/barrier layer 61. As a result, in the functional separation portion 60, a visible light transmittance of 85% ($\lambda$=520 nm) and a high gas barrier property are maintained.

(2-4) Photosensitive Portion 70

The photosensitive portion 70 is an organic photoconductor (OPC) in which an undercoat layer (UCL) 71, a carrier generation layer (CGL) 72, a carrier transport layer (CTL) 73, and a protection layer 74 are sequentially stacked in the stated order on the transparent conductive layer 62 of the functional separation portion 60.

A fundamental structure of the above-mentioned digital photosensitive drum 2 according to the embodiment of the present invention includes the substrate, the control circuit, the signal lines, the EL layer, the scanning lines, the transparent insulating layer, the transparent conductive layer (ITO), and the OPC. A signal line driver serving as a control circuit portion for controlling the voltage of each signal line is separated into multiple parts. Between the signal line driver and each signal line, there is formed a vertical contact structure with a through-hole. A scanning line driver serving as a control circuit portion for controlling the voltage of each scanning line is disposed outside an image-forming area of the drum 2. Each scanning line is made of ITO or of ITO and an auxiliary electrode, and has a top emission structure.

In the digital photosensitive drum 2 of the embodiment of the present invention, the self-luminous device portion 50 includes the control circuit 51 and the signal line layer 52 formed on the control circuit 51. In other words, a distance between the control circuit 51 and each signal line 52*e* is shorter than a distance between the control circuit 51 and each scanning line 54*a*. When the distance between the control circuit 51 and each signal line 52*e* is shorter, the electrical signal hardly attenuates, thereby enabling stable control of each signal line 52*e*.

If the organic EL layer 53 is formed between the signal lines 52*e* and the scanning lines 54*a*, it is possible to cause the EL layer 53 to emit light by a PM process. Accordingly, in the case where the control circuit 51 is formed on the cylindrical substrate 40, it is possible to control light emission with a layered structure (1) in which the control circuit 51, the signal line layer 52, the EL layer 53, and the scanning line layer 54 are formed in the stated order from a side of the cylindrical substrate 40. In addition, it is also possible to control light emission with a layered structure (2) in which the control circuit 51, the scanning line layer 54, the EL layer 53, and the signal line layer 52 are formed in the stated order from the cylindrical substrate 40 side. In other words, with any one of the structures (1) and (2), it is possible to control light emission. However, it can be said that the structure (1) is better than the structure (2), because the signal lines 52*e* are controlled more rapidly (within a short period of time) than the scanning lines 54*a*. Specifically, a position of the EL layer 53 in the longitudinal direction of the drum 2 to be caused to emit light is determined by a image data signal, and the control of the signal lines 52*e* has to be performed based on the image data. Meanwhile, the scanning lines 54*a* are associated with a position of the EL layer 53 in the circumferential direction of the drum 2 to be caused to emit light, so the control of the scanning lines 54*a* is not changed based on the image data. Thus, the signal lines 52*e* controlled rapidly (within a short period of time) are disposed near the control circuit 51, with the result that the attenuation of the data signal can be suppressed. In particular, the control circuit 51 is formed on the substrate 40, so the signal lines 52*e* and the control circuit 51 can be formed to be close to each other.

Further, in the digital photosensitive drum 2 according to the embodiment of the present invention, the scanning lines 54*a* of the scanning line layer 54 are each made of a transparent conductive oxide (ITO). The scanning lines 54*a* are each transparent, so it is impossible to prevent the light emitted in the EL layer 53 from advancing to the photosensitive portion 70. As described above, the EL layer 53 is formed between the signal lines 52*e* and the scanning lines 54*a*. Accordingly, at least one of the signal line 52*e* and the scanning line 54*a* is to be formed on the EL layer 53. In this case, the signal lines 52*e* are each annularly formed, so it is difficult to form the signal lines made of ITO by sputtering or the like. On the other hand, the scanning lines 54*a* are linearly formed in the longitudinal direction of the drum 2, so the electrode wires made of ITO can be formed more easily than the annular signal lines 52*e*. Accordingly, when there is employed a structure in which the scanning lines 54*a* are formed on the EL layer 53, and the scanning lines 54*a* are each made of the transparent conductive oxide (ITO), the light emitted in the EL layer 53 can be irradiated on the photosensitive portion 70 without interference.

With the simple structure as described above, it is possible to mount the digital photosensitive drum, which includes the exposure source and the photosensitive member integrated with each other, in the conventional structure employing the electrophotographic image forming process. In addition, writing start position correction or sub-scanning registration correction of an inline color machine can be performed without being affected by fluctuation in image forming speed.

(3) Process of Manufacturing Digital Photosensitive Drum 2

Figure 9:
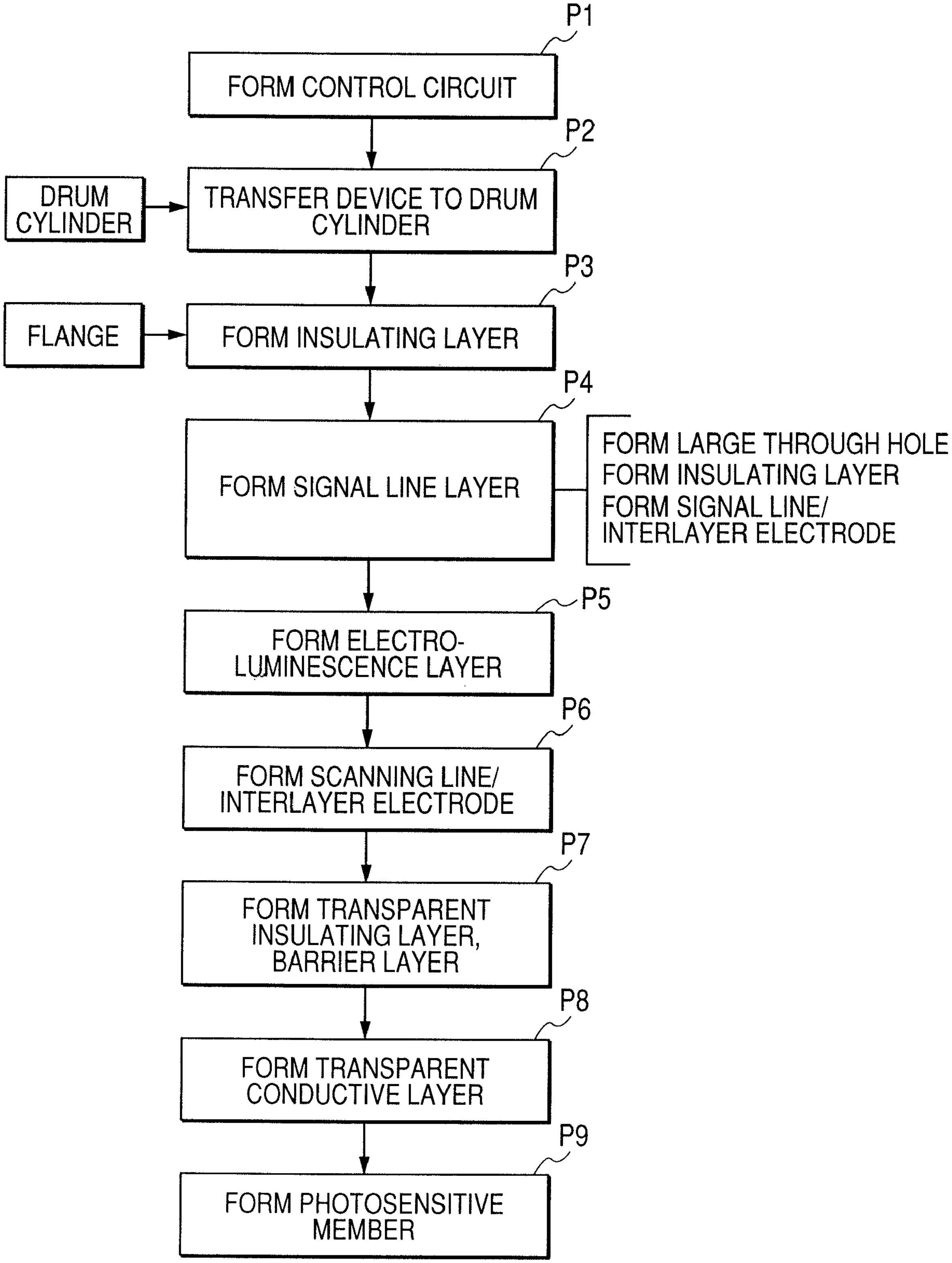
FIG. 9 is a flowchart of an outline of a manufacturing process for the digital photosensitive drum.

FIGS. 9, 10A to 10K, and 11A to 11E illustrate an outline of a process of manufacturing the digital photosensitive drum 2 according to the embodiment of the present invention. FIG. 9 is a flowchart of the outline of the manufacturing process, FIGS. 10A to 10K and 11A to 11E are schematic process charts of the manufacturing process.

FIGS. 10A to 10K are diagrams taken along the longitudinal direction of the digital photosensitive drum 2 so as to contain the scanning lines 54*a*. A horizontal direction of FIGS. 10A to 10K corresponds to the longitudinal direction of the digital photosensitive drum 2.

FIGS. 11A to 11E are diagrams taken along the circumferential direction of the digital photosensitive drum 2 so as to contain the control circuit 51 for controlling each of the scanning lines formed in an end portion in the longitudinal direction. A horizontal direction of FIGS. 11A to 11E corresponds to the circumferential direction of the digital photosensitive drum 2.

Figure 18:
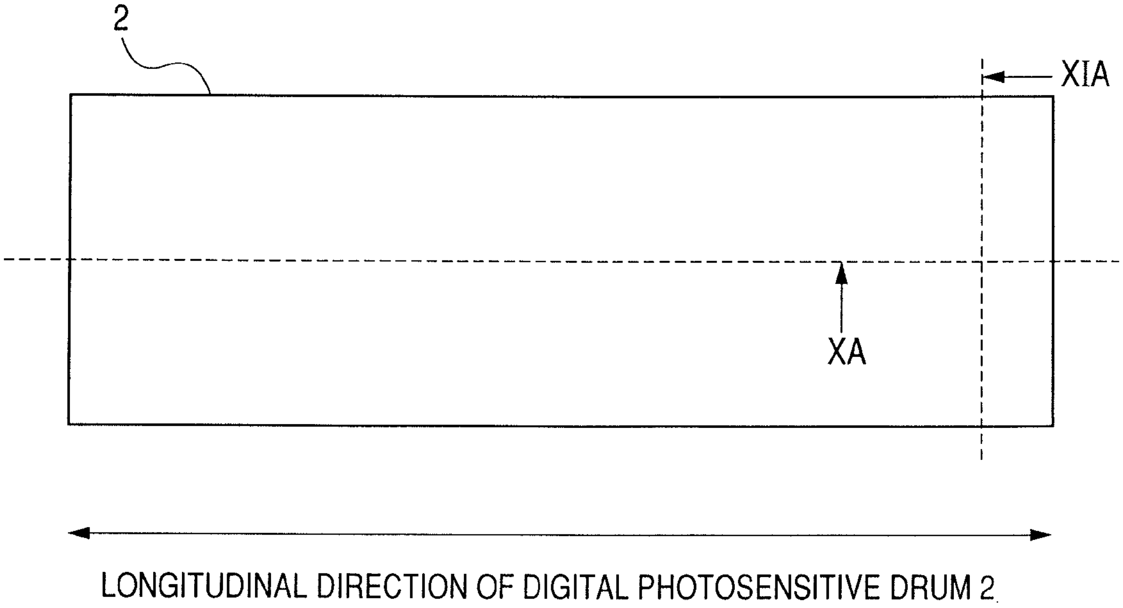
FIG. 18 is a plan diagram of the digital photosensitive drum.

FIG. 18 is a plan diagram of the digital photosensitive drum 2. FIGS. 10A to 10K are views as looking from a direction indicated by the arrow XA of FIG. 18. FIGS. 11A to 11E are views as looking from a direction indicated by the arrow XIA of FIG. 18.

Process P1: Formation of Control Circuit

On an original substrate (glass substrate), by employment of the poly-Si process, a control circuit (device) for controlling each of the signal lines and scanning lines, which is a circuit that drives each of the signal lines and includes an interface (I/F), is formed.

Process P2: Device transfer

The device is removed from the original substrate and is transferred onto the outer peripheral surface of drum cylinder 40. Specifically, the control circuit 51 is formed on the outer peripheral surface of the drum cylinder 40 (see FIG. 10A).

The device is bonded and fixed onto the outer peripheral surface of the drum cylinder 40 so as to be wound around the outer peripheral surface. In this case, a tolerance between an outer diameter dimension of the drum cylinder 40 and a winding perimeter of the device is absorbed, so a wound and bonded portion of the device still has a seam with an interval of 250 μm or smaller.

Process P3: Formation of Insulating Layer 52*a*

At both ends of the drum cylinder 40, the flanges 31*a* and 31*b* (see FIG. 5A) are mounted. On the outer peripheral surface of the drum on which the control circuit 51 is formed, an organic polymer layer as the interlayer insulating layer 52*a* is formed (see FIG. 10B).

In this embodiment of the present invention, a polyimide film is coated with a thickness of 10 μ as the insulating layer 52*a* by dipping. Through the process, the seam portion is filled, and the outer peripheral surface of the drum becomes a seamless continuous curved surface.

Process P4: Formation of Signal Line Layer 52

Figure 10A:
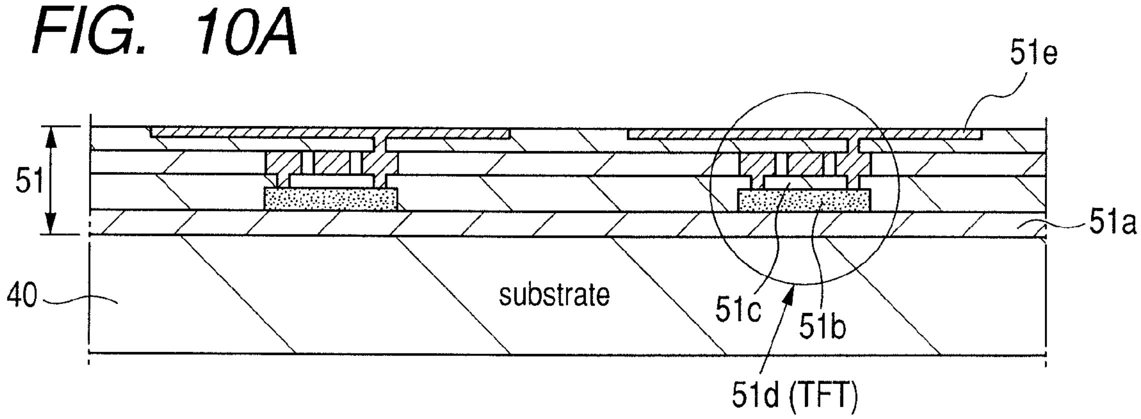
FIG. 10A is a schematic process chart illustrating the manufacturing process for device transfer.
Figure 10B:
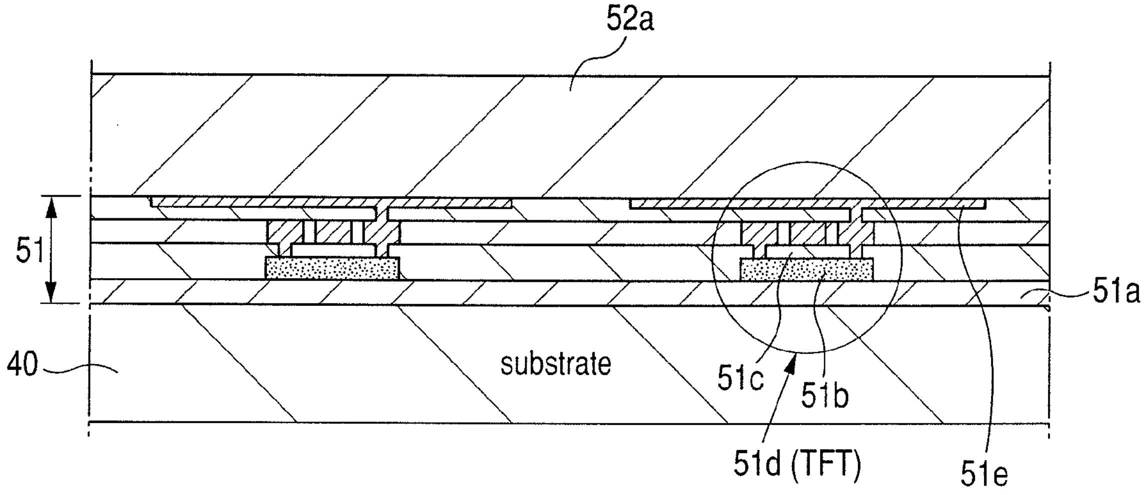
FIG. 10B is a schematic process chart illustrating the manufacturing process for formation of an insulating layer.
Figure 10C:
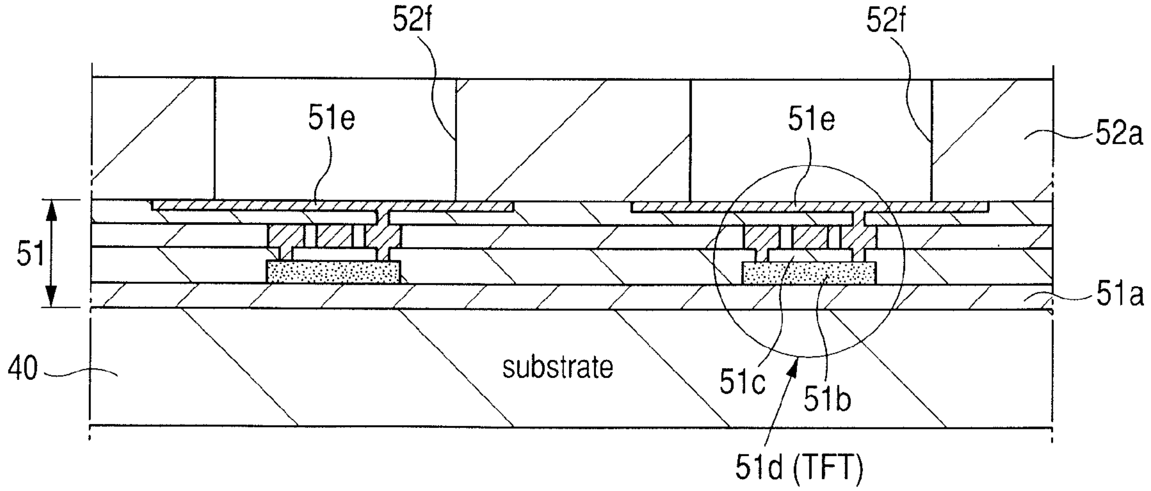
FIG. 10C is a schematic process chart illustrating the manufacturing process for formation of via holes.
Figure 10D:
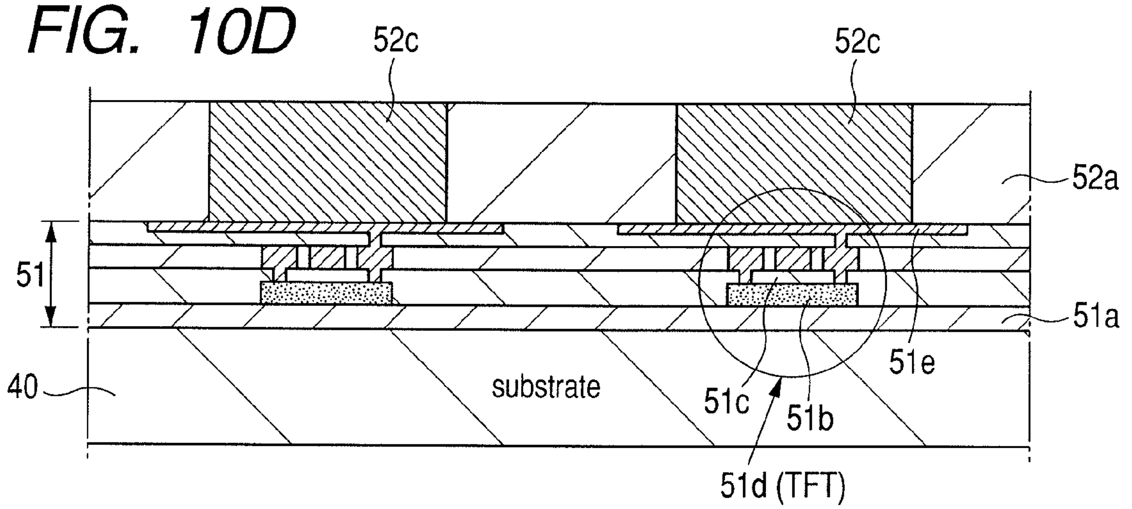
FIG. 10D is a schematic process chart illustrating the manufacturing process for formation of through-hole electrodes.

On the insulating layer 52*a*, toward the center of the signal line electrode pad 51*e* of the drive TFT 51*d* of the control circuit 51, each via hole (large through-hole) 52*f* is formed by laser beam machining (see FIG. 10C).

Then, an electrode is embedded in each via hole 52*f* by using conductive paste. Specifically, each through-hole electrode (large) 52*c* is formed (see FIG. 10D).

Figure 11A:
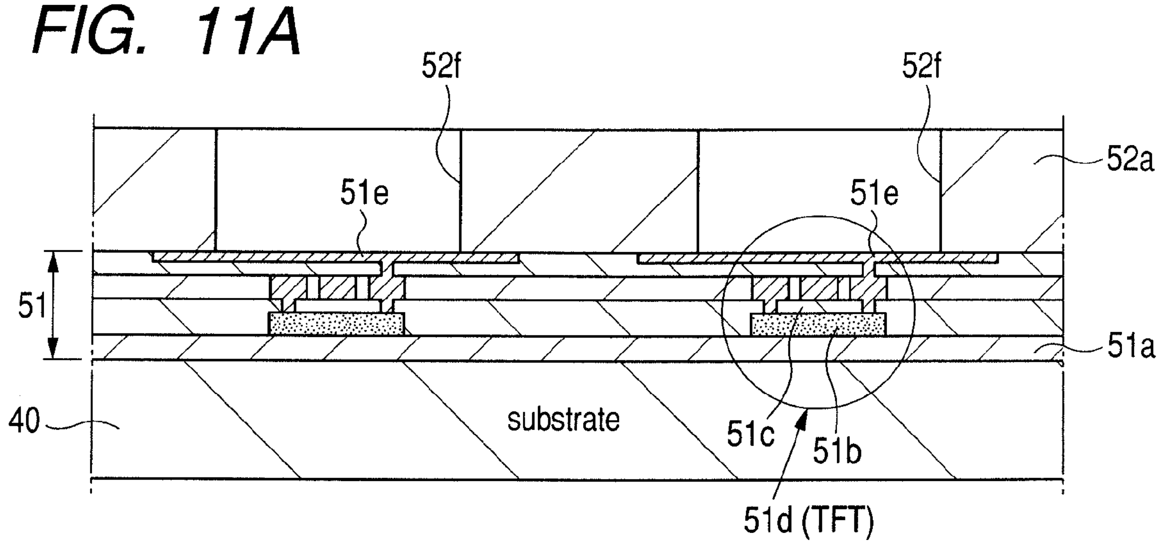
FIG. 11A is a schematic process chart illustrating the manufacturing process.
Figure 11B:
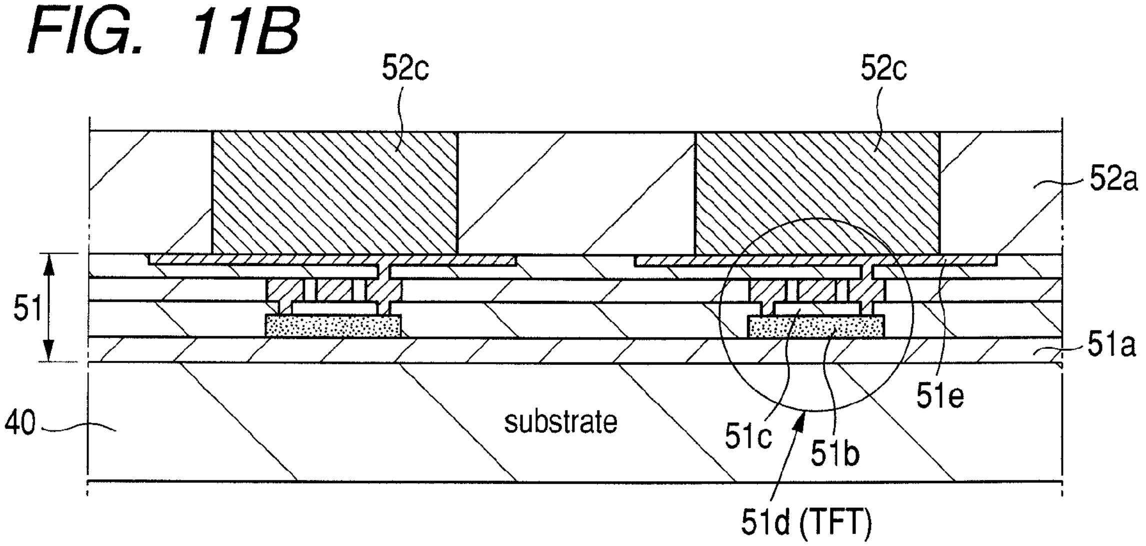
FIG. 11B is a schematic process chart illustrating the manufacturing process.

Further, also on a side of the scanning line drive circuit, formation of each through-hole (large) 52*f* for the scanning lines 54*a* and formation of each through-hole electrode 52*c* are performed in the same manner (see FIGS. 11A and 11B).

The outer peripheral surface formed of the insulating layer 52*a* and the through-hole electrode 52*c* is polished by a CMP process to be smoothed.

Figure 10E:
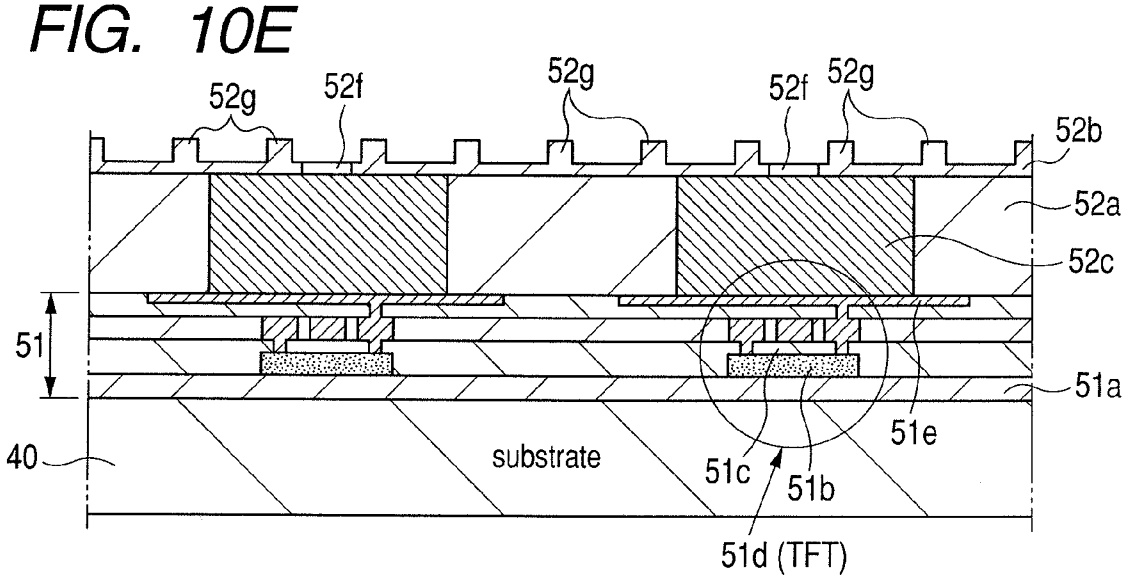
FIG. 10E is a schematic process chart illustrating the manufacturing process.
Figure 10F:
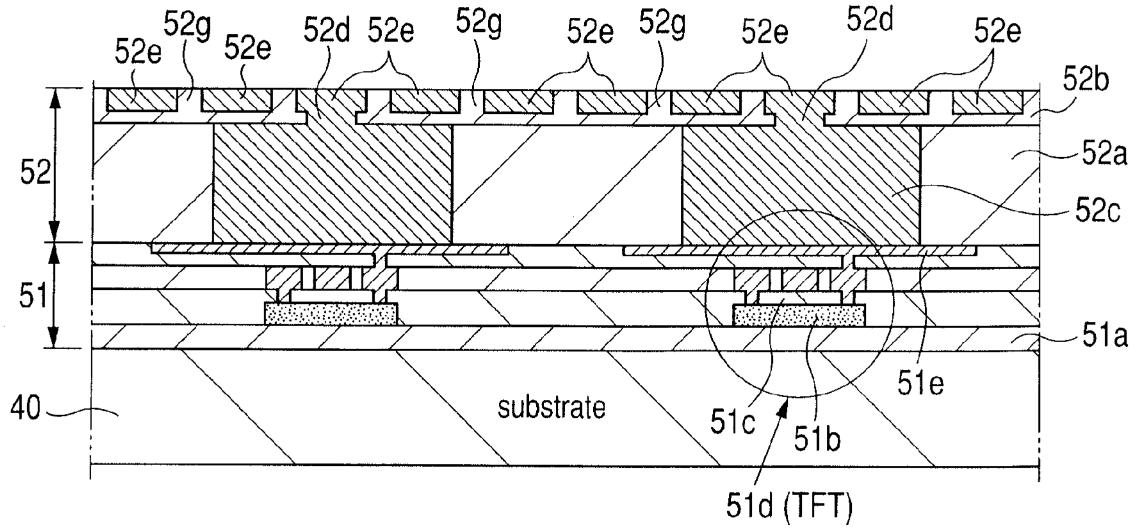
FIG. 10F is a schematic process chart illustrating the manufacturing process.

Then, by the photolithography process, multiple signal lines (first electrode wires) 52*e* are formed in such a manner that the signal lines 52*e* are annularly formed with no seam in the circumferential direction of the drum cylinder, are separated from each other by each insulating member 52*g*, and are arrayed in the longitudinal direction of the drum cylinder (see FIGS. 10E and 10F).

Reference character 52*f* denotes the through-hole (small), and reference character 52*g* denotes the partition wall of the insulating member for patterning the signal lines. The through-hole electrode 52*d*, which is formed in the through-hole (small) 52*f*, is formed simultaneously with the signal lines 52*e*. The signal lines 52*e* are each connected to the electrode pad 51*e* of the drive TFT 51*d* via the through-hole electrodes 52*d* and 52*c*.

Figure 11C:
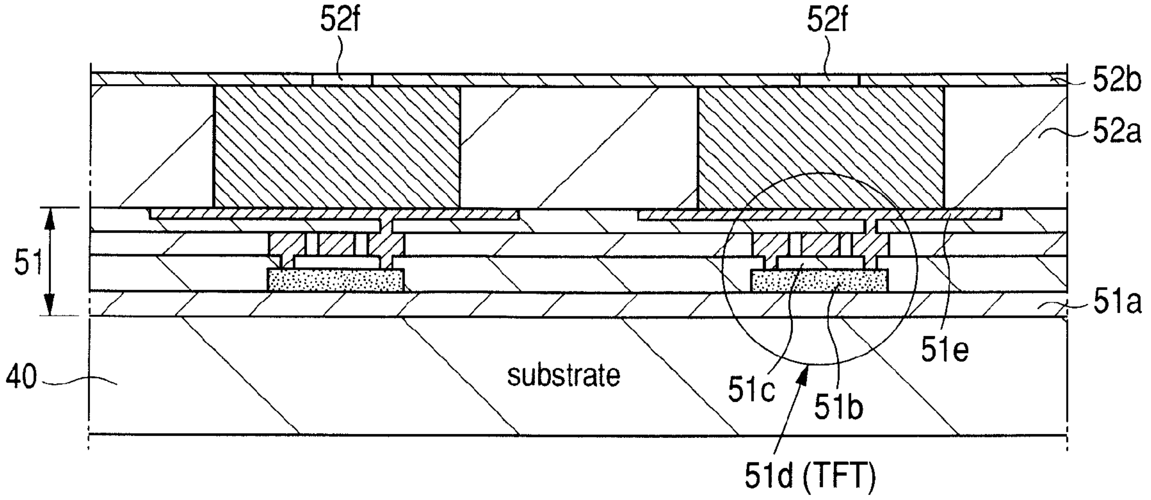
FIG. 11C is a schematic process chart illustrating the manufacturing process.

Further, also on a side of the scanning line drive circuit, each through-hole (small) 52*f* is formed (see FIG. 11C).

In this manner, the signal line layer 52 is formed by a process performed from the outside with respect to the cylindrical member (drum cylinder to which device is transferred).

For this reason, the signal lines 52*e* each can be annularly formed with no seam. A seam is not formed unlike the related art in which the seam is formed when the sheet-like self-luminous device is formed and then wound around the cylindrical member.

Process P5: Formation of Organic EL layer 53

Figure 10G:
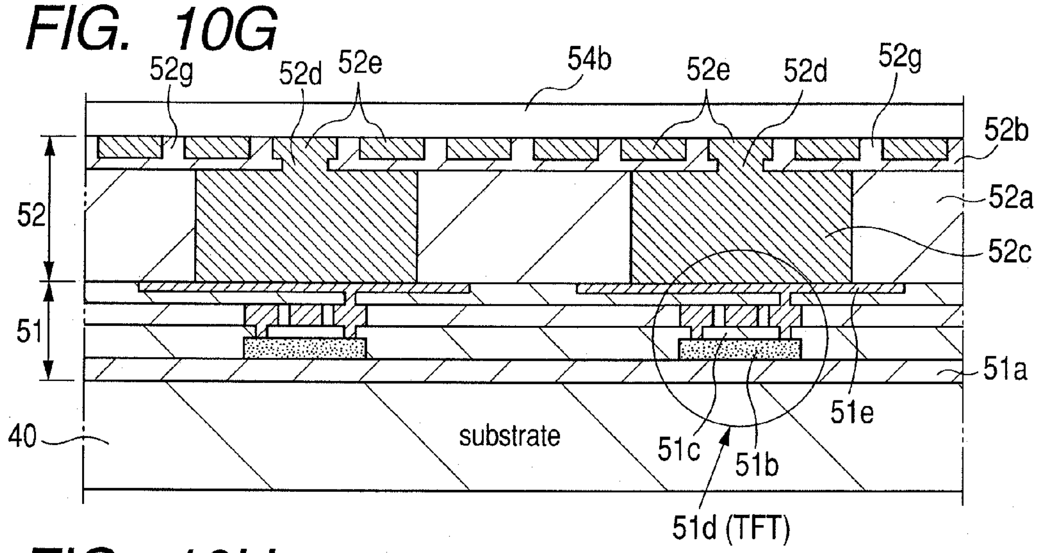
FIG. 10G is a schematic process chart illustrating the manufacturing process for formation of a partition wall.
Figure 11D:
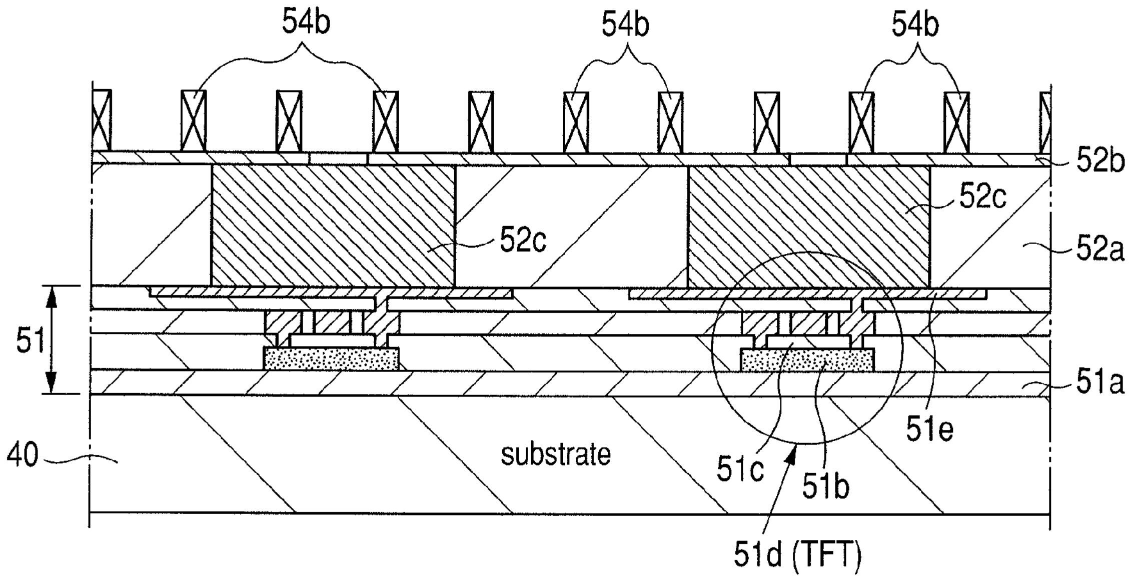
FIG. 11D is a schematic process chart illustrating the manufacturing process.
Figure 11E:
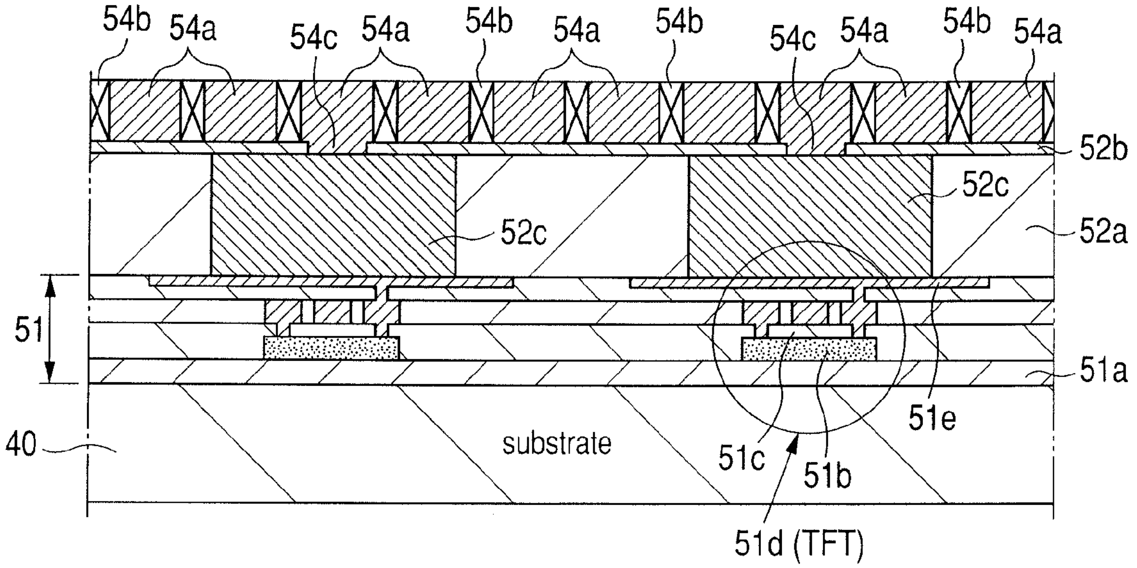
FIG. 11E is a schematic process chart illustrating the manufacturing process.

On the surface of the signal line layer 52, multiple partition walls 54*b*, each of which is an insulating member for patterning the scanning lines, are formed linearly in the longitudinal direction of the drum cylinder, and at predetermined intervals and widths in the circumferential direction of the drum cylinder (see FIGS. 10G and 11D).

Figure 10H:
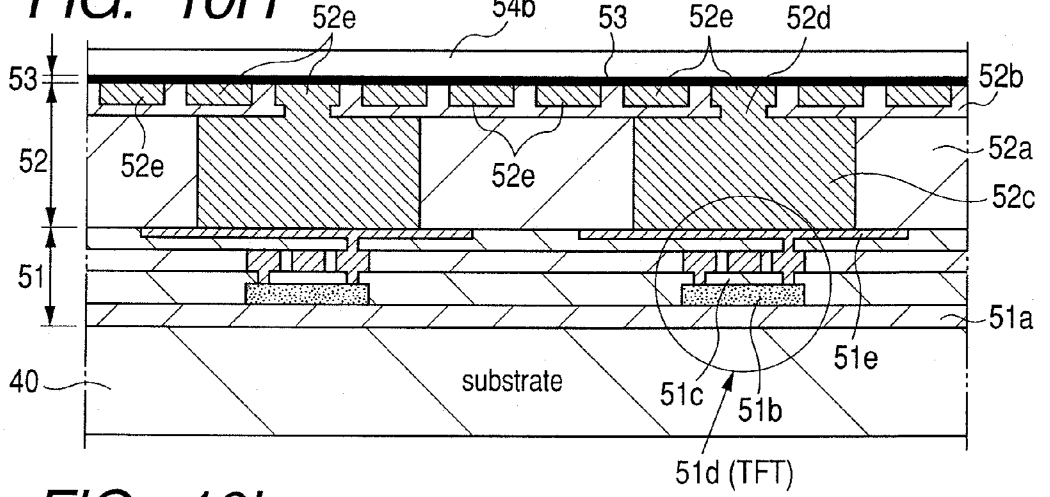
FIG. 10H is a schematic process chart illustrating the manufacturing process for formation (deposition) of an organic electroluminescence (EL) layer.

Next, the EL layer 53 is formed by vapor deposition (FIG. 10H).

Process P6: Formation of Scanning Line Layer

Figure 10I:
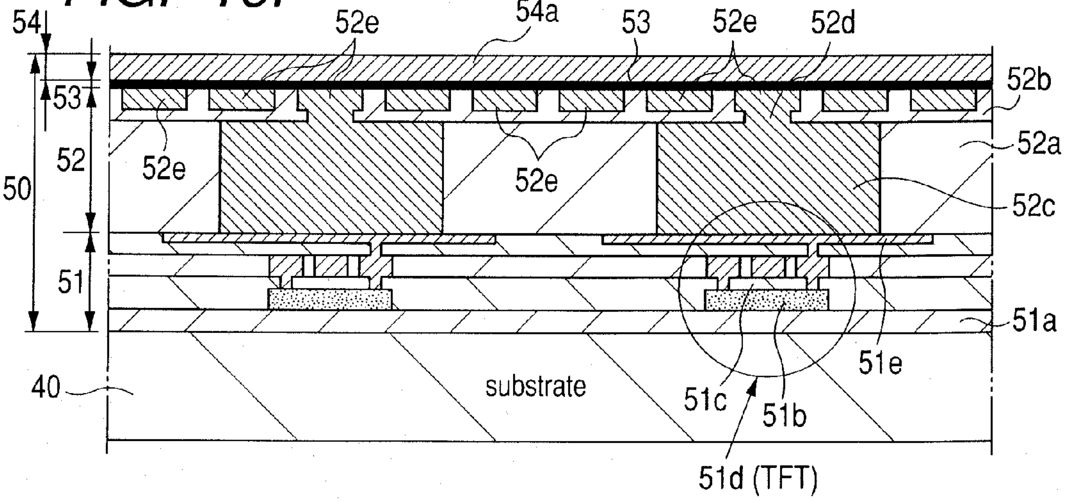
FIG. 10I is a schematic process chart illustrating the manufacturing process for formation (sputtering) of a scanning line.

By use of a shadow mask, the scanning lines 54*a* are patterned and formed by sputtering using ITO (see FIGS. 10I and 11E). In this case, each of through-hole electrodes (interlayer electrode) 54*c* is also formed between the scanning lines 54*a* and the through-holes (large) 52*c* formed on the scanning line drive circuit side.

By the above-mentioned processes P1 to P6, on the outer peripheral surface of the drum cylinder 40, the control circuit 51, the signal line layer 52, the EL layer 53, and the scanning line layer 54 are sequentially stacked in the stated order, thereby forming the self-luminous device portion 50.

Process P7: Formation of Transparent Insulating/Barrier Layer 61

Figure 10J:
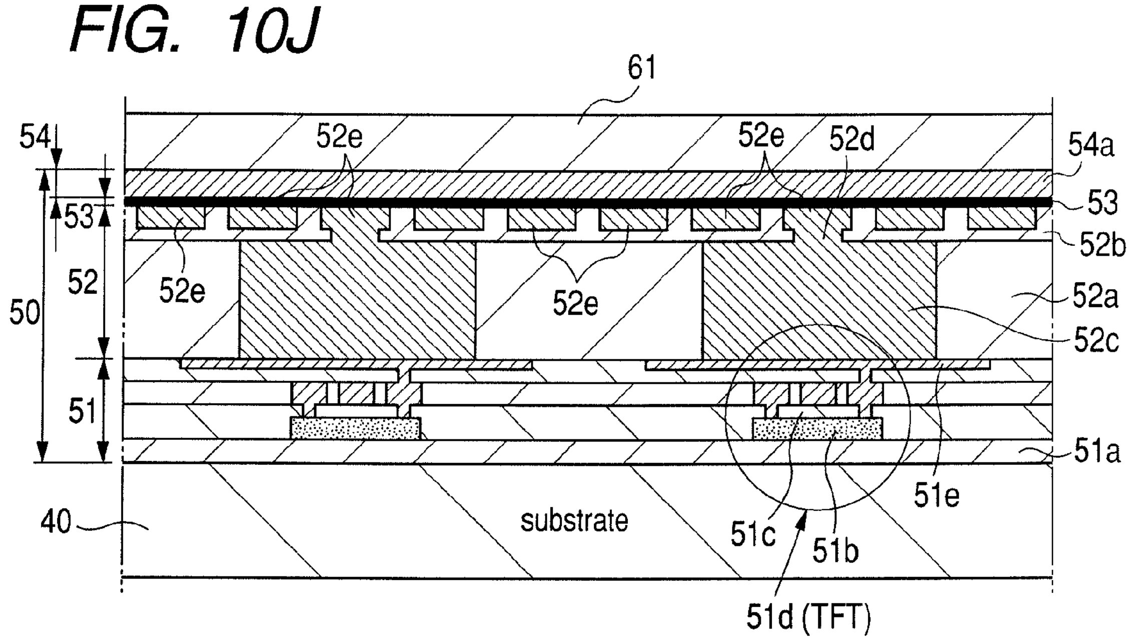
FIG. 10J is a schematic process chart illustrating the manufacturing process for formation (deposition) of a transparent insulating/barrier layer.

On the outer peripheral surface of the self-luminous device portion 50 formed as described above, the polymer (PEN) layer and the metal oxide ($Al_2O_3$) layer are alternately formed as the transparent insulating/barrier layer 61 by a continuous vapor deposition process (see FIG. 10J).

Process P8: Formation of Transparent Conductive Layer 62

Figure 10K:
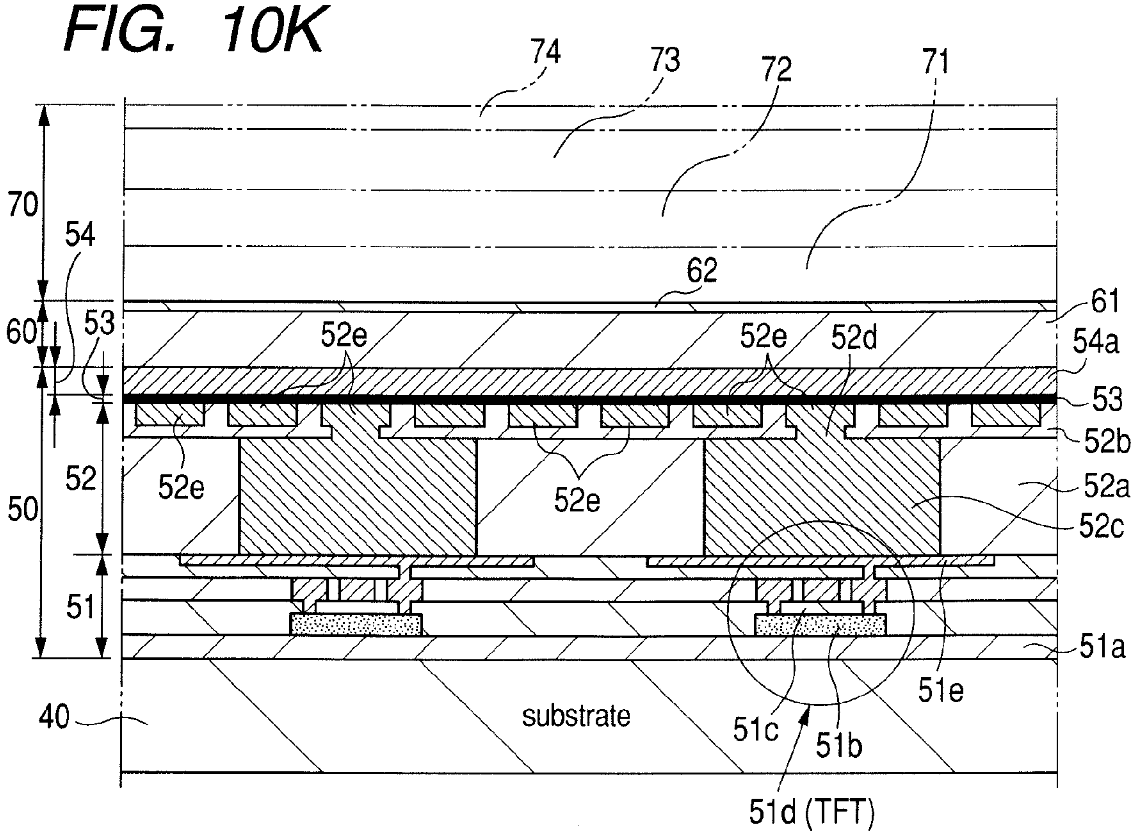
FIG. 10K is a schematic process chart illustrating the manufacturing process for formation (sputtering) of a transparent conductive layer.

On the outer peripheral surface of the transparent insulating/barrier layer 61, the ITO is formed as the transparent conductive layer 62 by sputtering (see FIG. 10K).

By the above-mentioned processes P7 and P6, on the outer peripheral surface of the self-luminous device portion 50, the functional separation portion 60 having a gas barrier property, a surface conductivity, and a visible light transmittance is formed.

Process P9: Formation of Photosensitive Portion 70

On the outer peripheral surface of the functional separation portion 60, an organic photoconductor (OPC) layer in which the undercoat layer (UCL) 71, the carrier generation layer (CGL) 72, the carrier transport layer (CTL) 73, and the protection layer 74 are stacked is formed as the photosensitive portion 70 by dipping coating.

All the processes of film formation, photolithography, and formation of the through-hole electrodes, for forming the self-luminous device portion 50, the functional separation portion 60, and the photosensitive portion 70 are processes performed from the outer peripheral surface side of the drum.

By the above-mentioned manufacturing processes P1 to P9, the digital photosensitive drum 2 which has a small diameter and has no seam in the circumferential direction of the drum can be realized.

Specifically, before execution of the process P2 in which the device is transferred to form the control circuit for controlling the signal lines and scanning lines onto the drum cylinder 40, a discontinuous portion, that is, a seam is left on the periphery of the drum. However, the outer diameter portion of the drum obtained after the interlayer insulating layer 52*a* is formed in the process P3, a seamless cylindrical surface shape is obtained. Further, in the subsequent steps, the signal lines 52*e* are each annularly formed, and the scanning lines 54*a* are arranged symmetrically with respect to the drum rotational axis.

With the above-mentioned structure, there is formed a seamless pixel matrix having light emitting points (pixels) in the vicinity of each intersecting point between each of the signal lines 52*e* and each of the scanning lines 54*a*. Specifically, the digital photosensitive drum 2 which has a small diameter and has no seam is manufactured. As a result, it is possible to realize downsizing of the printer main body in which the exposure device is contained. Stability of the output image with respect to vibration and load fluctuation is improved.

(4) Driving Method for Digital Photosensitive Drum 2

Figure 12:
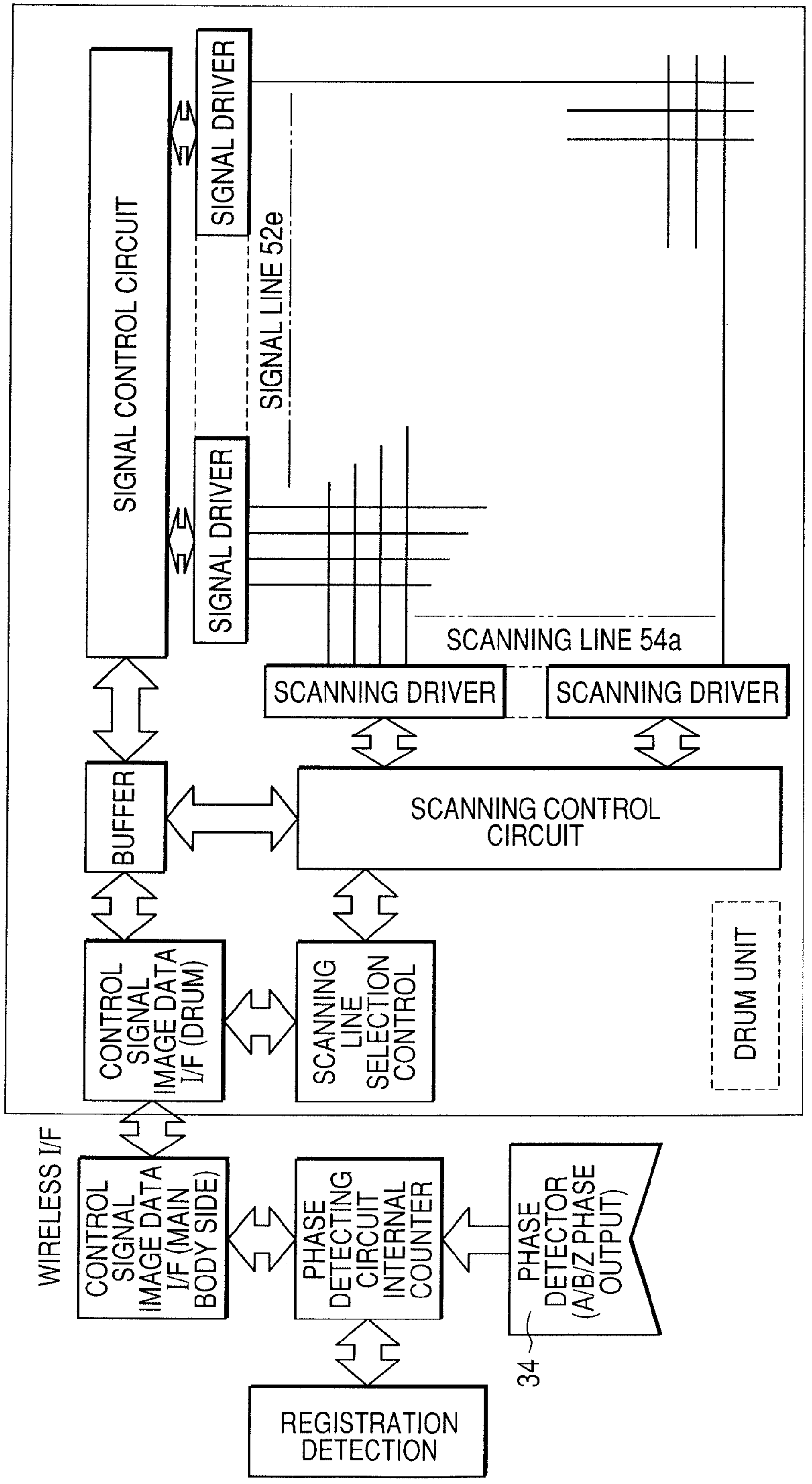
FIG. 12 is a block diagram of a drive circuit of the digital photosensitive drum.

FIG. 12 is a block diagram illustrating the drive circuit of the digital photosensitive drum 2.

Exchange of the electrical information signals containing the image data between the main body control circuit portion B of the printer A and the control circuit portion provided on the side of the digital photosensitive drum 2 rotationally driven, is performed by using a wireless interface.

In this embodiment of the present invention, in order to drive the light-emitting pixels formed on the drum 2 side, passive matrix (PM) drive is performed by sequentially selecting the scanning lines 54*a*. Specifically, the drive circuit sequentially selects the scanning lines 54*a* of the scanning line layer 54, thereby driving the signal lines 52*e* of the signal line layer 52 in synchronism with the selection of the scanning lines 54*a*. Thus, the drive circuit drives the signal lines 52*e* by using a line-sequential system in which the light-emitting pixel portions in the vicinity of each intersecting point between each of the scanning lines 54*a* and each of the signal lines 52*e* are caused to emit light, thereby forming a light-emitting pattern corresponding to the image data.

In the embodiment of the present invention, 1,800 scanning lines 54*a* are sequentially selected at each scanning line interval of about 42 μm (resolution of 600 dpi), at an image forming speed of 120 mm/s, and with a stationary scanning period of about 352 μs (scanning frequency of 2.8 KHz).

Control is performed such that a scanning line potential becomes a positive potential at the time of selection, and becomes 0 V (ground voltage (GND)) at the time of non-selection. In synchronism with the selection of the scanning lines, turning on/off of the signal lines is controlled, thereby forming the light-emitting pattern corresponding to the image data on the scanning lines. In this embodiment of the present invention, the scanning line potential is set to about 0 V (GND) at the time of selection of the signal lines 52*e*, and is set to +5 V at the time of non-selection. The potential at the time of non-selection of the scanning lines 54*a* and the potential at the time of selection of the signal lines 52*e* are set to substantially equal to each other, thereby preventing light emission on the scanning lines at the time of non-selection.

FIG. 6 illustrates a phase detection structure of the digital photosensitive drum 2 according to the embodiment of the present invention. FIG. 6 illustrates a part in vicinity of the driving-side end portion of the digital photosensitive drum 2 and a part of the belt unit 7, which is a target to which the drum 2 is positioned.

The drum 2 has an encoder wheel portion 33 for phase detection, which is provided at the outer diameter portion of the driving-side drum flange 31*a* that is fixed coaxially with the drum 2 at the end portion of the drum cylinder 40. Accordingly, when the drum 2 is rotationally driven, the encoder wheel portion 33 is also rotated together with the drum 2. A rotation central axis of the encoder wheel portion 33 is provided coaxially with the central axis of the drum 2.

A phase division pattern of the encoder wheel portion 33 is held in a phase relationship between the scanning lines 54*a* of the scanning line layer 54 of the drum 2.

The encoder wheel portion 33 corresponds to an etching pattern of black color Cr formed in the outer diameter portion of the drum flange 31*a* made of an aluminum alloy. In the embodiment of the present invention, the number of divisions is 1,800 (900 divisions for each of A and B phases) and a Z-phase for detecting 0 point is included.

On the other hand, a phase detector 34 is a reflective photodetector with a detector for the Z-phase, and is disposed so as to be fixed to the belt unit frame 7*a*. The phase division pattern of the encoder wheel portion 33 is detected by the phase detector 34. Detection signals of the phase detector 34 are input to a phase detecting circuit internal counter (see FIG. 12) of the main body control circuit portion B.

In this embodiment of the present invention, as illustrated in FIG. 4, the exposure point "c" is positioned between the charging position "a" and the developing position "b", that is, in the vicinity of an uppermost portion in a vertical direction of the cross section of the drum. A phase detecting point by the phase detector 34 is positioned in the vicinity of a lowermost portion in the vertical direction of the cross section of the drum, which corresponds to the primary transfer position "d".

A rotation angle of the drum 2 is obtained by accumulating A/B phase outputs detected by the phase detector 34 to the internal counter of the main body control circuit portion B. The internal counter is operated in a mode in which the internal counter is reset when the Z-phase, which is a reference position of the drum 2, is detected.

In the main body control circuit portion B, when a trigger for starting image formation is issued, a scanning line selection control potion (see FIG. 12) detects a current phase of the drum 2 based on a current value of the internal counter to thereby select the scanning line 54*a* to be exposed and driven. Specifically, at the time of image formation, the main body control circuit portion B calculates the phase with respect to the belt unit 7 (printer main body) of the drum 2 in response to the output signals from the phase detector 34, thereby determining the scanning line to be driven based on the calculated value. When a writing start trigger is issued, the scanning line 54*a* to be written on the drum is selected based on the current phase of the drum 2. In synchronism with a current phase pulse of the drum 2, writing scanning is performed.

Figure 13:
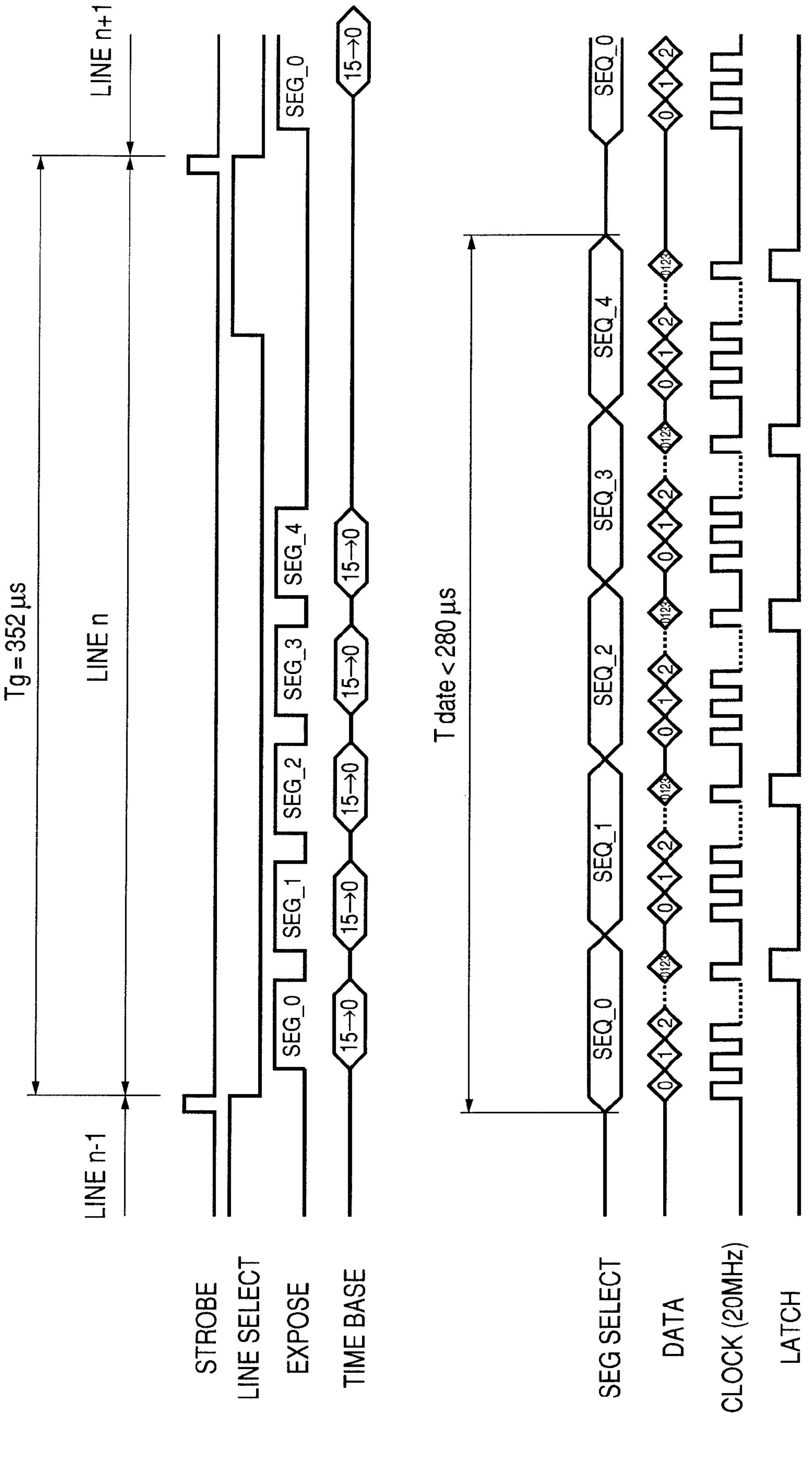
FIG. 13 is a drive timing chart for the digital photosensitive drum.

FIG. 13 illustrates a drive timing. One (1) strobe period corresponds to a scanning line selection period. In the embodiment of the present invention, all the 5,120 signal lines are divided into 5 segments to be controlled. For this reason, in the case of light emission, time-shared drive is performed in which a time of about 50 μs is allocated to each segment to be sequentially driven.

In the light-emitting pixel data, LINEn+1 data is latched with a frame in which the scanning line LINEn emits light. 1,024 pieces of light-emitting data (4-bit data containing light-emitting time information) of each segment are transferred to the signal drive circuit by the time-sharing, thereby being latched to a buffer.

Figure 14:
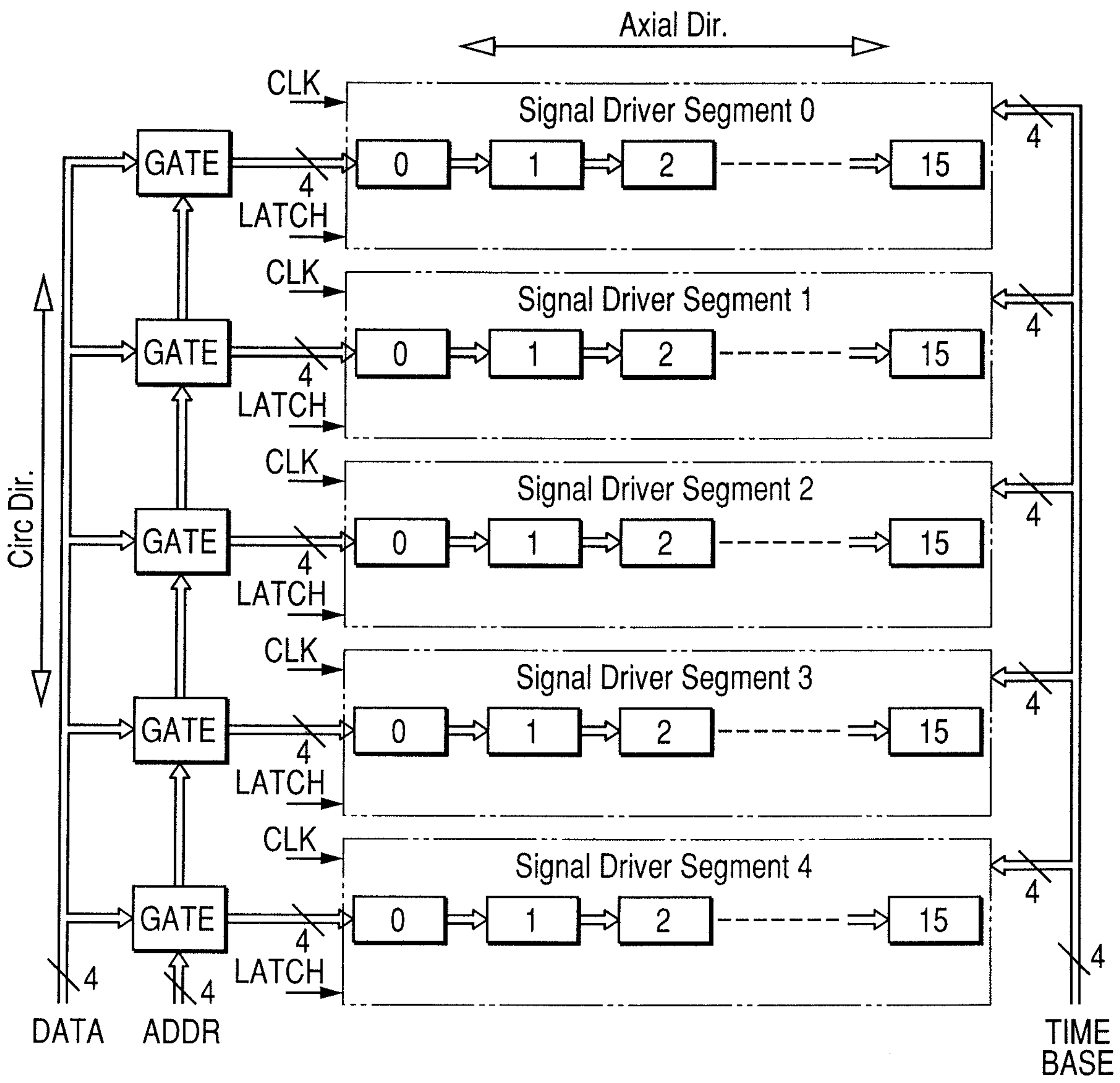
FIG. 14 is a block diagram illustrating data transfer.

FIG. 14 is a block diagram illustrating the data transfer. Each segment (Segment) is selected based on an address (ADDR) generated in the control portion, and is transferred to the segment corresponding to the data. In this case, a frequency of a clock for transferring (CLK) data is 20 MHz.

With the above-mentioned structure, in the self-luminous device portion 50, through the sequential selection of the scanning lines 54*a* and the drive for turning on/off the signal lines 52*e* in synchronism with the selection of the scanning lines 54*a*, fluorescent spots are generated in the organic EL layer 53 in the vicinity of each portion at which each of the scanning lines 54*a* and each of the signal lines 52*e* of the selection pixel intersects with each other. With the fluorescent spots, the photosensitive portion 70 stacked on the fluorescent spots is directly exposed, thereby forming the charge density distribution on the surface of the photosensitive member, that is, an electrostatic latent image.

With reference to FIGS. 15A to 15C, 16A to 16C, and 17A and 17B, a detailed description is given of detection of a rotary phase of the drum 2 with respect to the printer main body.

Figure 15C:
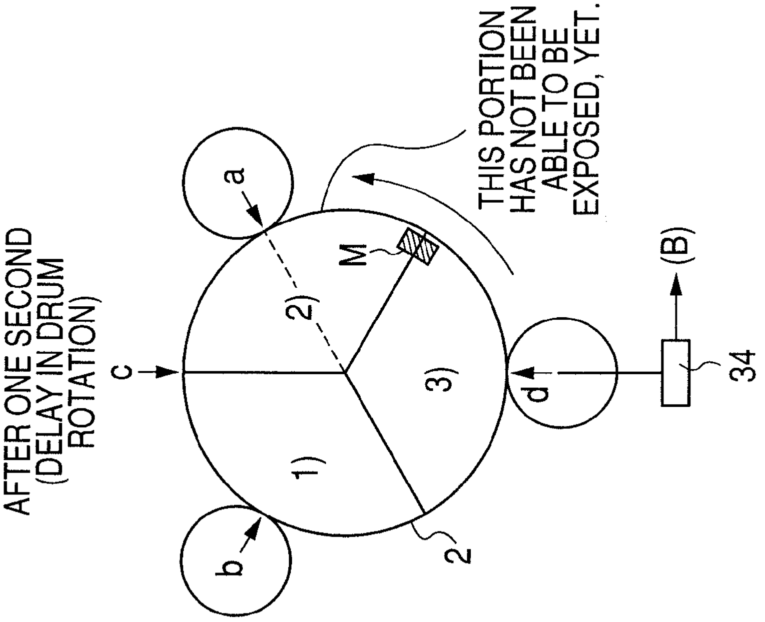
FIGS. 15A, 15B, and 15C are diagrams for describing detection of a rotary phase of the digital photosensitive drum.
Figure 15B:
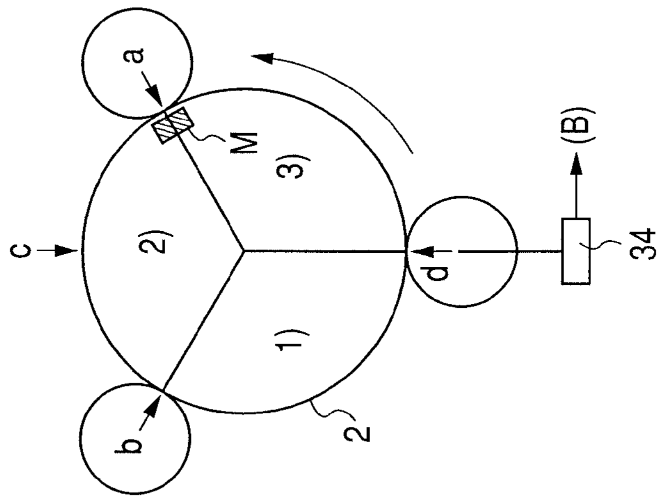
Figure 15A:
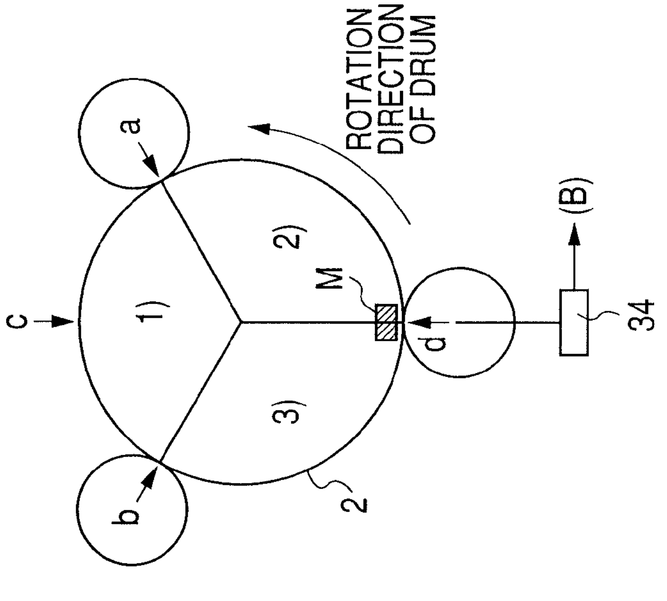

For example, as illustrated in FIG. 15A, the charging position "a" and the developing position "b" are positioned with 120° with respect to the drum 2. A middle position between the charging position "a" and the developing position "b" is set as the exposure point "c". A position 180° opposite from the exposure point "c" is set as the transfer position "d". A rotational angular velocity of the drum 2 is set to 120°/second. It is assumed that, between an area 2) and an area 3) of the drum 2, there is only one patch (so-called home position detection) M for position detection, and that, at a position corresponding to the transfer position "d", there is a phase detector 34 for detecting the patch.

In FIG. 15A, when the phase detector 34 detects the patch M at the transfer position "d", it becomes apparent that an area 1) is positioned between the charging position "a" and the developing position "b". It is necessary to perform the exposure between the charging position "a" and the developing position "b", so the main body control portion B determines that the area 1) is an area in which a latent image can be formed. As illustrated in FIG. 15B, an area 2) is subjected to exposure after the elapse of one (1) second from the detection of the patch M.

Thus, in the case of starting the exposure based on time, there is no problem when the rotational speed of the drum 2 is constant. However, when the rotational speed of the drum 2 rapidly decreases, as illustrated in FIG. 15C, even in a case where there is a portion which is not ready to be subjected to exposure (portion which is not ready to be written), there is a possibility that the portion is to be subjected to exposure. In other words, there is a possibility that the formation of the latent image in not satisfactorily performed due to the fluctuation in angular velocity of the drum 2.

Figure 16C:
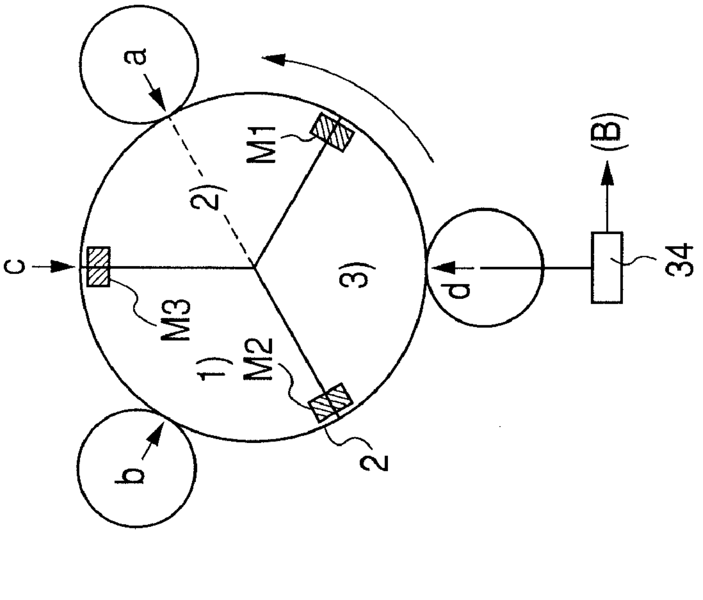
FIGS. 16A, 16B, and 16C are diagrams for describing detection of the rotary phase of the digital photosensitive drum.
Figure 16B:
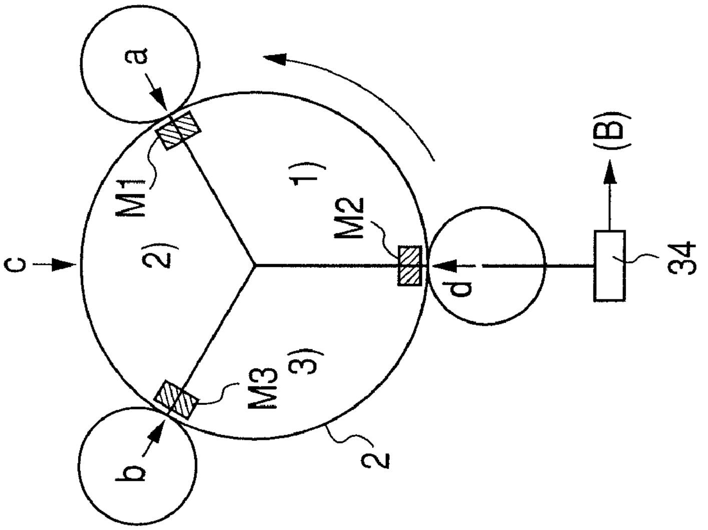
Figure 16A:
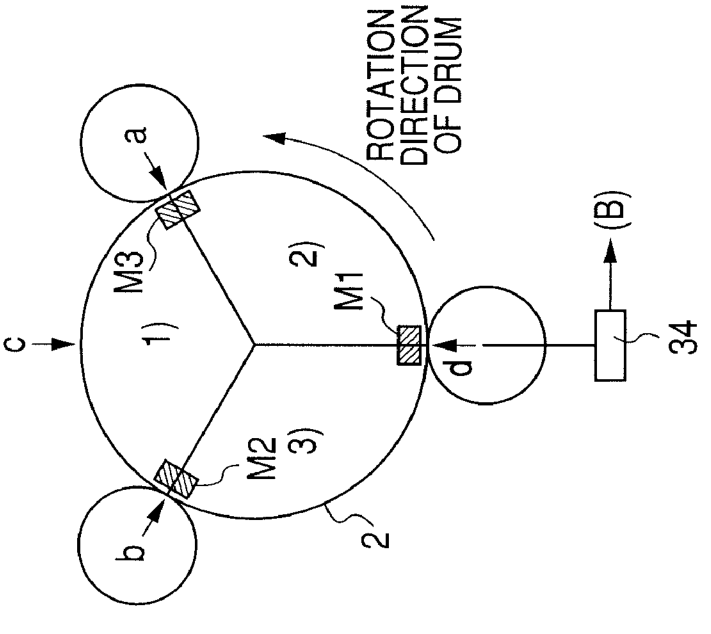

In view of the above discussion, an interval between division patterns (patterns corresponding to patches M of FIGS. 15A to 15C) for phase detection is set within 120° between the charging position "a" and the developing position "b", thereby reducing the effect of the fluctuation in speed of the drum 2 on the encoder wheel portion 33 of the above embodiment. In FIGS. 16A to 16C, patterns (patches) M1, M2, and M3 for phase detection are provided at boundaries (every 120°) between the areas 1), 2), and 3), respectively.

In FIG. 16A, when the phase detector 34 detects the patch M3 at the transfer position "d", it is apparent that there is the area 1) between the charging position "a" and the developing position "b".

Further, as illustrated in FIG. 16B, when the subsequent pattern M2 is detected after the elapse of one (1) second, it is apparent that there is the area 2) between the charging position "a" and the developing position "b".

Thus, by providing the patterns M1, M2, and M3, it is possible to determine which area of the drum 2 is currently positioned between the charging position "a" and the developing position "b". As a result, the timing of the exposure can be determined not based on the time but based on the patterns M1, M2, and M3. In other words, the exposure is started by using the detected patterns M1, M2, and M3 as a trigger.

In the above-mentioned method, even when the rotational speed of the drum 2 rapidly decreases, as illustrated in FIG. 16C, the subsequent pattern does not reach the transfer position "d", that is, the phase detector 34, so it is apparent that there is a portion which is not ready for the exposure in the area 2).

Accordingly, it is possible to determine that the exposure is not executed in the area 2), thereby preventing the situation where the exposure is performed even when there is the portion which is not ready for the exposure.

Figure 17A:
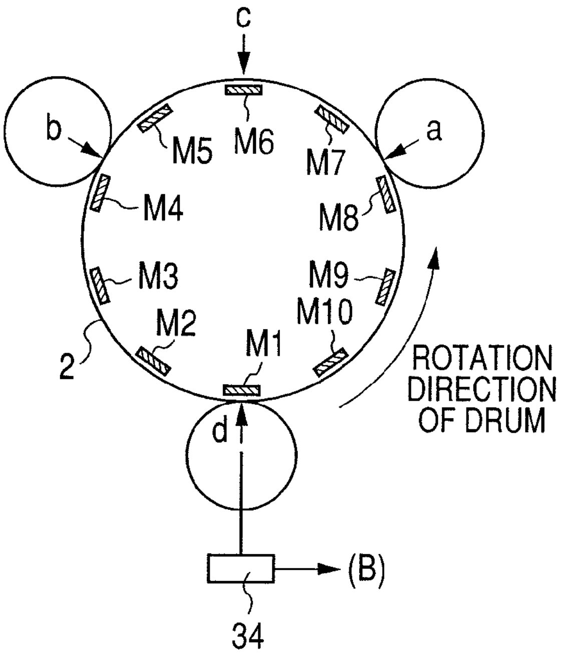
FIGS. 17A and 17B are diagrams for describing detection of the rotary phase of the digital photosensitive drum.

As a matter of course, when the number of divided patterns of the encoder wheel portion 33 is further increased, the accuracy for detecting the position of the drum 2 is increased. For example, as illustrated in FIG. 17A, there are provided 10 patterns M1 to M10, the rotational phase position of the drum 2 can be detected in 10 divisions. Accordingly, ideally, if there are the same number of patterns as that of the scanning lines 54*a* contained in the scanning line layer 54, it is possible to recognize the patterns and the scanning line 54*a* based on one-to-one correspondence.

Figure 17B:
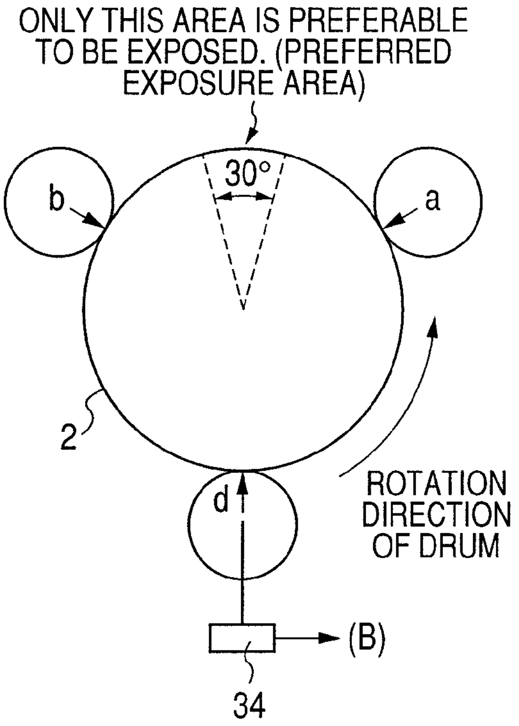

In FIG. 16A, it is assumed that, when the interval between the adjacent patterns is set to be equal to or smaller than the angle formed between the charging position "a" and the developing position "b", it is possible to detect which area of the drum 2 is positioned at least between the charging position "a" and the developing position "b". In a case where the exposure is to be performed only in a specific area between the charging position "a" and the developing position "b", it is effective to increase the number of patterns. For example, in a case where there is an area suitable for the exposure between the charging position "a" and the developing position "b", assuming that it is not desirable to perform the exposure immediately after the charge position "a" or immediately before the developing position "b", when the number of patterns is increased by division, it is possible to perform the exposure in the area suitable for the exposure. For example, as illustrated in FIG. 17B, when the area suitable for the exposure has a central angle 30°, 360°÷30°=12 is established. When the pattern of the encoder wheel portion 33 is divided into 12 patterns, the exposure can be performed in the area suitable for the exposure.

Thus, it is effective that each interval between the patterns for detecting the rotational phase of the drum of the encoder wheel portion 33, that is, the divided number of phase detection is further increased, because the exposure can be performed in the specific area (area suitable for exposure) between the charging position "a" and the developing position "b".

In this manner, each interval (divided number of phase detection) between patterns for detecting the rotational phase of the drum of the encoder wheel portion 33 is set within the interval between the charging position "a" and the developing position "b" of the drum 2.

As a result, with a simple structure, a digital photosensitive drum in which an exposure source and a photosensitive member are integrated with each other can be mounted in a conventional structure employing an electrophotographic image forming process. In addition, the writing start position correction or the sub-scanning registration correction of an inline color machine can be performed without the effect of the fluctuation in image forming speed.

As described above, according to the present invention, a digital photosensitive drum with seamless electrode wires can be manufactured. Since the electrodes wires are seamless, it is possible to form an image with a length longer than the perimeter of the digital drum photosensitive member. Accordingly, the digital photosensitive drum with a small diameter can be manufactured. As a result, the printer main body can be downsized by containing the exposure device inside thereof. Further, the provision of the digital photosensitive drum enables improvement of the stability of the output image with respect to vibration and load fluctuation.

(5) Others (1) The image forming apparatus according to an embodiment of the present invention is the in-line color image forming apparatus, but the image forming apparatus can be applied to a color image forming apparatus of a single-drum system and to a monochromatic image forming apparatus.

(2) The charging unit of the drum 2 is not limited to the contact charging using the charging roller according to the embodiment of the present invention. A corona discharge device of a non-contact type can also be used.

(3) The developing unit of the drum 2 is not limited to the non-magnetic, one-component contact development process of the embodiment of the present invention. It is possible to employ various types of development processes including a contact type and a non-contact type using one-component developer or two-component developer.

(4) It is also possible to use an image forming apparatus without a cleaner, in which a dedicated cleaning unit is not provided, and the residual toner remaining after the transfer is developed by a developing unit of a developing-and-cleaning type (in which cleaning is carried out simultaneously with developing).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-328095, filed Dec. 5, 2006, and No. 2007-293102, filed Nov. 12, 2007, which are hereby incorporated by reference herein in their entirety.

What is claimed is:

1. An electrophotographic photosensitive drum, comprising:

a cylindrical substrate;

a light emitting element matrix layer which includes:

a first electrode wire layer including multiple first electrode wires each extending in a circumferential direction of the cylindrical substrate;

a second electrode wire layer including multiple second electrode wires each extending in a longitudinal direction of the cylindrical substrate; and an electroluminescence layer, the multiple first electrode wires being arrayed in the longitudinal direction of the cylindrical substrate so as to be separated from each other by an insulating member, the multiple second electrode wires being arrayed in the circumferential direction of the cylindrical substrate so as to be separated from each other by an insulating member, the first electrode wire layer, the electroluminescence layer, and the second electrode wire layer being stacked in the stated order toward a surface of the electrophotographic photosensitive drum from the cylindrical substrate; and a functional separation portion which includes:

a transparent insulating layer provided on the light emitting element matrix layer; and a transparent conductive layer provided on the transparent insulating layer; and a photosensitive portion provided on the transparent conductive layer, wherein each of the multiple first electrode wires is annularly formed with no seam.

2. An electrophotographic photosensitive drum according to claim 1, wherein the light emitting element matrix layer comprises a control portion, which controls a voltage between the multiple first electrode wires and the multiple second electrode wires, and the first electrode wire layer is provided on the control portion.

3. An electrophotographic photosensitive drum according to claim 1, wherein the multiple second electrode wires are made of a transparent conducting oxide.

4. An electrophotographic image forming apparatus, comprising:

an electrophotographic photosensitive drum that can be rotated;

a charging device, which charges the electrophotographic photosensitive drum; and a developing device, which develops a latent image formed on the electrophotographic photosensitive drum, with a developer, wherein the electrophotographic photosensitive drum comprises:

a light emitting element matrix layer which includes:

a first electrode wire layer including multiple first electrode wires each extending in a circumferential direction of a cylindrical substrate and arrayed in a longitudinal direction of the cylindrical substrate so as to be separated from each other by an insulating member;

a second electrode wire layer including multiple second electrode wires each extending in the longitudinal direction of the cylindrical substrate and arrayed in the circumferential direction of the cylindrical substrate so as to be separated from each other by an insulating member; and an electroluminescence layer, the first electrode wire layer, the electroluminescence layer, and the second electrode wire layer being stacked in the stated order from a side of the cylindrical substrate; and a functional separation portion which includes:

a transparent insulating layer provided on the light emitting element matrix layer; and a transparent conductive layer provided on the transparent insulating layer; and a photosensitive portion provided on the transparent conductive layer, wherein each of the multiple first electrode wires is annularly formed with no seam.

5. An electrophotographic image forming apparatus according to claim 4, wherein the light emitting element matrix layer comprises a control portion, which controls the multiple first electrode wires and the multiple second electrode wires, and the first electrode wire layer is provided on the control portion.

6. An electrophotographic image forming apparatus according to claim 4, wherein the multiple second electrode wires are made of a transparent conducting oxide.

* * * * *